(12) United States Patent
Hong et al.

(10) Patent No.: US 7,737,992 B2
(45) Date of Patent: Jun. 15, 2010

(54) METHOD AND SYSTEM FOR TRANSFORMING ADAPTIVELY VISUAL CONTENTS ACCORDING TO TERMINAL USER'S COLOR VISION CHARACTERISTICS

(75) Inventors: Jin-Woo Hong, Daejon-si (KR); Seung-Ji Yang, Wonju-si (KR); Yong-Man Ro, Daejon-Si (KR); Je-Ho Nam, Seodaemun-gu (KR); Jin-Woong Kim, Daejon-si (KR); Jae-Joon Kim, Daejon-si (KR); Cheon-Seog Kim, Daejon-si (KR)

(73) Assignees: Electronics and Communications Research Institute, Daejeon-Si (KR); Inter Jungbo Co., Ltd., Seoul (KR); Information and Communications Educational Foundation, Daejon-Si (KR)

( * ) Notice: Subject to any disclaimer, the term of this patent is extended or adjusted under 35 U.S.C. 154(b) by 0 days.

(21) Appl. No.: 12/189,708

(22) Filed: Aug. 11, 2008

(65) Prior Publication Data

US 2009/0066720 A1    Mar. 12, 2009

Related U.S. Application Data

(63) Continuation of application No. 10/512,730, filed on Oct. 26, 2004, now abandoned.

(51) Int. Cl.
*G09G 5/02* (2006.01)
*G06K 9/00* (2006.01)

(52) U.S. Cl. .................. 345/603; 382/114; 382/162

(58) Field of Classification Search ............. 382/100, 382/114, 162, 166, 167, 169, 276, 277, 280, 382/281, 302; 345/22, 72, 83, 88, 549, 581, 345/589, 592, 593, 597, 600, 604, 690, 630; 715/865, 275; 717/105, 109, 113, 125; 348/263, 348/265, 266, 268
See application file for complete search history.

(56) References Cited

U.S. PATENT DOCUMENTS 4,765,731 A * 8/1988 Williams .................... 351/243

(Continued)

FOREIGN PATENT DOCUMENTS

JP       63-282883        11/1988

(Continued)

OTHER PUBLICATIONS

Brettel, H., et al., "Computerized Simulation of Color Appearance for Dichromats," Journal of Optical Society of America, vol. 14, No. 10, pp. 2647-2655 (1997).

(Continued)

*Primary Examiner*—Abolfazl Tabatabai
(74) *Attorney, Agent, or Firm*—Ladas & Parry, LLP

(57) ABSTRACT

Disclosed are a method and a system that adaptively transform visual contents inputted from a network, in accordance with the visual characteristics of a terminal user. A visual characteristics descriptor that describes the information of the user visual characteristics in a predetermined format is proposed. The descriptor includes the information of the color vision deficiency type and the color vision deficiency degree. The color vision deficiency may be described in numerical degree or textual degree. The invention adaptively transforms visual contents differently in accordance with the color vision deficiency type.

34 Claims, 11 Drawing Sheets

U.S. PATENT DOCUMENTS

| | | | |
|---|---|---|---|
| 5,589,898 A | 12/1996 | Atkinson | 351/237 |
| 6,229,916 B1 * | 5/2001 | Ohkubo | 382/167 |
| 6,309,117 B1 | 10/2001 | Bunce et al. | 400/61 |
| 6,362,830 B1 * | 3/2002 | Walraven | 345/600 |
| 6,704,024 B2 * | 3/2004 | Robotham et al. | 345/581 |
| 7,124,375 B1 * | 10/2006 | Steele et al. | 715/865 |
| 2001/0053246 A1 | 12/2001 | Tachibana et al. | 382/162 |

FOREIGN PATENT DOCUMENTS

| | | |
|---|---|---|
| JP | 01-501370 | 5/1989 |
| JP | 02-001077 | 1/1990 |
| JP | 03-085135 | 4/1991 |
| JP | 11-175050 | 7/1999 |
| JP | 12-306074 | 11/2000 |
| JP | 2002-014895 | 1/2002 |
| JP | 14-055671 | 2/2002 |
| WO | 99/24964 | 5/1999 |

OTHER PUBLICATIONS

Kovács, G., et al., "Enhancing color representation for anomalous trichromats on CRT monitors," *Color Research & Application*, vol. 26, No. 1, supplement, pp. 273-276, (2001).

Meyer, et al., "Color-defective vision and computer graphics displays," *IEEE Computer Graphics and Applications, IEEE Service Center, New York, NY, US*, vol. 8, No. 5, pp. 28-40 (Sep. 1988).

* cited by examiner

R: red primary
G: green primary
B: blue primary
C: cyan
M: magenta
Y: yellow
W: white
O: black (a) 1202          (b) 1204          (c) 1206

(a) 1702  (b) 1704  (c) 1706

& 1

METHOD AND SYSTEM FOR TRANSFORMING ADAPTIVELY VISUAL CONTENTS ACCORDING TO TERMINAL USER'S COLOR VISION CHARACTERISTICS

RELATED APPLICATIONS

This patent application is a continuation application of U.S. Ser. No. 10/512,730 filed on Oct. 26, 2004 now abandoned.

TECHNICAL FIELD

The present invention relates to a method and a system for transforming visual contents and, in particular, to a method and a system for adaptively transforming visual contents in accordance with the color vision characteristics of a user.

BACKGROUND ART

The MPEG-21 is being established as the next generation standard for a multimedia framework by MPEG (Moving Picture Expert Group), which is a Working Group of ISO/IEC JTC 1/SC 29. The goal of MPEG-21 is to realize a multimedia integration framework capable of freely and easily using multimedia contents despite the wide-range characteristics of networks, terminals and users, existing under various environments, by unifying the standards of the existing MPEGs or other standardization groups. The digital item adaptation part of the MPEG-21, Part 7 relates to adaptively transforming the multimedia contents (or digital items) in accordance with the characteristics of networks, terminals (video display devices) and users, the standardization of which is now in progress.

Preceding researches for users with a color vision deficiency are as follows: In "Computerized Simulation of Color Appearance for Dichromats" (Journal of Optical Society of America. A, v.14, no. 10, 1997, 2647-2655), H. Brettel studied an algorithm for allowing common users to experience the color vision characteristics of users with dichromacy. However, in this paper, only an algorithm capable of simulating the color vision characteristics of users with the color vision deficiency is disclosed. An adaptation algorithm for obtaining information that is impossible or difficult to obtain due to the color vision deficiencies is not mentioned. This method requires that contents manufacturers perform a simulation process for dichromats before selecting the colors of the contents. An object of such a method is to avoid a combination of colors that is difficult to be distinguished by the dichromats, if possible, by performing a simulation process to determine whether the dichromats can discriminate the selected combination of the colors.

However, this method urges the contents manufacturers to use limited number of colors, thereby restricting the creativity of the manufacturers and possibly inducing the inconvenience and monotony in the process of recognizing the color information for normal users. Therefore, this method is difficult to satisfy the requirements of various users. Accordingly, there is a need for adaptation not in the contents manufacturing step, but in accordance with individual vision abilities or terminal devices. Nowadays, numerous digital multimedia contents are manufactured even in a day. Thus, such a process performed in the contents manufacturing step has a disadvantage in that it is impossible to adaptively transform the already existing contents.

In order to solve these problems, improving the abilities for recognizing the color information processing of humans with a color vision deficiency by directly transforming the colors of visual contents may be considered. This method has an advantage in that it is not required to redesign a display device and it is possible to adaptively transform all existing contents.

A method of adaptation for users with a color vision deficiency is discussed in "Enhancing Color Representation for Anomalous Trichromats on CRT Monitors Color" (G. Kovacs, Research and Application, v.26 SUPP, 2001, S273-S276), in which an algorithm is disclosed which allows the users to see like a normal user by computing a filter to be mounted in cathode ray tube (to be referred as "CRT") and applying the obtained filter to a RGB spectrum response value of a corresponding CRT monitor. However, this method applies a filter to a monitor and has a disadvantage in that it is impossible to perform a transformation in accordance with the contents if a plurality of digital items, i.e. a number of images, exist in a screen. Furthermore, it is a burden to purchase a specially manufactured CRT monitor in order to implement this function.

In the Gazette of U.S. Pat. No. 6,362,830, an equation for modeling a human with a color vision deficiency is vaguely derived. However, the process for adaptively transforming visual contents in accordance with the color vision characteristics of humans with a color vision deficiency is very complicated. Moreover, the method does not allow humans with a color vision deficiency to conceive the adaptively transformed visual contents, but allows humans to merely discriminate the visual contents. The disclosure of U.S. Pat. No. 6,362,830 is incorporated herein by reference.

Humans recognize colors and brightness of an object by the visual cells sensing the light reflected from the surface of the object. The visual cells existing in the retina include rod cells and cone cells. The visual cells are specialized cells that function to sense light. Human eyes contain about seven million cone cells and one hundred and thirty million rod cells. Humans discriminate light and darkness using the rod cells and recognize detailed appearance and colors using cone cells. As photochrome contained in the cone cells absorb photons, color recognition of humans is made. Normal humans have three types of cone cells, which absorb different portions of light with a visible wavelength, in the retina. The types are classified into L (long), M (middle) and S (short) in accordance with the peak sensitivity of a wavelength region absorbed by each type of cone cell. Humans recognize colors depending on the ratio of signals which the three types of cone cells generate in accordance with light.

Unlike the above conditions, color vision deficiency is the state in which any of the three types of cone cells does not exist naturally or function abnormally. If there are only two types of cone cells, it is called a dichromacy. In addition, if the function of the cone cells is abnormal, even though all three types exist, it is called an anomalous trichromacy. In the world, about 8% of males and about 0.5% of females have a color vision deficiency. Nevertheless, no method for treating color vision deficiencies exists at present; thus, this study has been commissioned to research a new scheme for treating color vision deficiencies.

It is medically impossible to make humans with a color vision deficiency see original colors. The goal of adaptation for dichromacy is to allow humans with a color vision deficiency to obtain information from the colors of contents at the same level of a normal human, although they are not capable of seeing the original colors.

DISCLOSURE OF THE INVENTION

It is an object of the present invention to provide a user Wraith a color vision deficiency with the semantic information of visual contents that corresponds to a normal user regardless of the color vision deficiency type and without any separate equipment.

It is another object of the present invention to provide a user with a color vision deficiency with the semantic information of visual contents that corresponds to a normal user in accordance with the digital items.

In order to achieve the above objects, there are provided a method and a system for adaptively transforming visual contents inputted from a network to be suitable for the color vision characteristics of a terminal user. At first, a color vision characteristic descriptor is presented which describes information on the color vision characteristics of the user in a standardized format in which the characteristics of the network and the terminal are not considered. The color vision characteristic descriptor in accordance with the present invention contains information on the color vision deficiency type and degree of the user. The color vision deficiency degree is texturally or numerically described. The color vision characteristic descriptor may further comprise information indicating the user identification information or the existence of a color vision deficiency. In addition, the color vision characteristic descriptor may comprise user environment, in particular, information on the illumination of the surroundings of the user.

The present invention adaptively transforms visual contents differently in accordance with the color vision deficiency type, i.e. depending on whether the color vision deficiency is dichromacy or anomalous trichromacy. At first, the present invention detects a region difficult for the user with a dichromacy if it is determined that the user is a dichromat from the information on the degree of deficiency for color vision contained in the color vision characteristic descriptor. The first method presented in accordance with the present invention detects the region difficult for the user with dichromacy by comparing the user limited LMS region to the LMS region of a normal human and then calculating the region in which the LMS value decreases. The second method presented in accordance with the present invention may be implemented in such a manner that the visual contents are transformed from the RGB color space to the CMYK color space for identification of the deficiency region and the pixels corresponding to a predetermined region in the CMYK color space are differentiated in accordance with the color vision deficiency type. If the deficiency region is differentiated in this manner, the visual contents are adaptively transformed to be suitable for the color vision characteristics of the user by tuning at least one of hue, saturation and intensity of the respective pixels corresponding to the deficiency region.

Meanwhile, if it is determined that the user is an anomalous trichromat, the visual contents are transformed from the RGB color space to the LMS color space and the substance of the visual contents are adaptively transformed by using a cone cell response function of the user eyes.

The present invention provides a method for adaptively transforming a visual contents to be suitable for the color vision characteristics of a user, the method comprising the steps of: receiving information on the color vision characteristics of the user; and executing the adaptation to the visual contents in accordance with the color vision characteristics, wherein the information on the color vision characteristics contains a description of color vision deficiency type and degree.

In addition, the present invention provides a method for adaptively transforming a visual contents to be suitable for the color vision characteristics of a user of an image display device, the method comprising the steps of: receiving information on the color vision characteristics of the user; receiving the visual contents; executing the adaptation on the visual contents in accordance with the color vision characteristics; and displaying the transformed visual contents through the image display device.

The present invention also provides a system for adaptively transforming visual contents to be suitable for the color vision characteristics of a user of an image display device, the system comprising: a means for receiving information on the color vision characteristics of the user; a means for receiving the visual contents; and a processing section for executing adaptation to the inputted visual contents in accordance with the information on the color vision characteristics.

As described above, in accordance with the present invention, a user with a color vision deficiency is able to receive semantic information from visual contents that are substantially identical to that of a normal user without any separate equipment, whereby the user with a color vision deficiency is able to freely and conveniently use multimedia contents. In addition, the present invention is applicable to the digital item adaptive part of MPEG-7 and MPEG-21, which are the international standards of media.

BEST MODE FOR CARRYING OUT THE INVENTION

Figure 1:
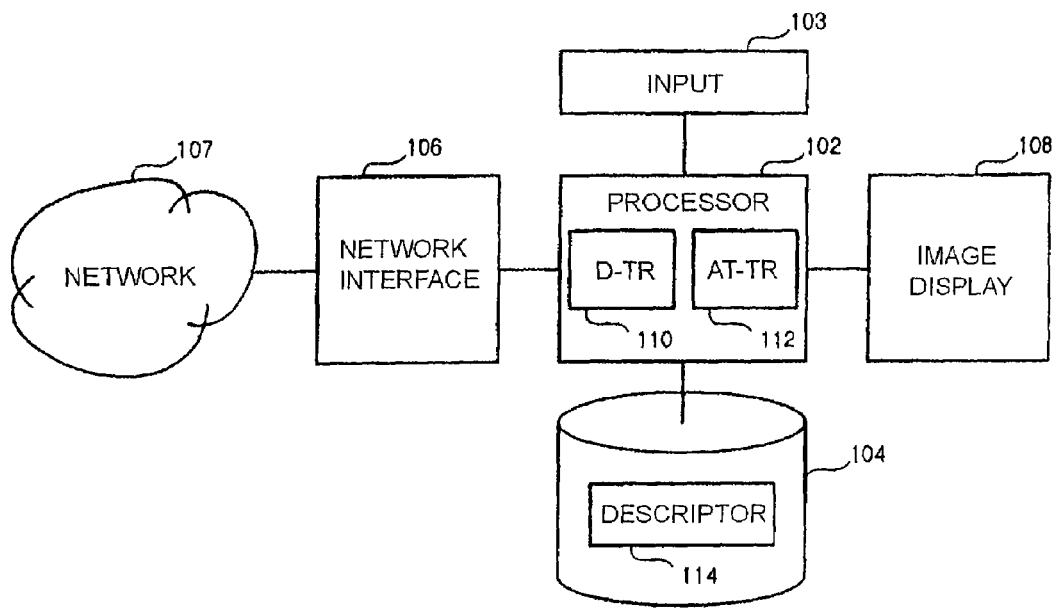
FIG. 1 is a block diagram of an adaptation system in accordance with an embodiment of the present invention.

Hereinbelow, the present invention will be described in detail with reference to the accompanying drawings. For the purpose of consistency in description, like reference numerals are used to indicate like components and signals in the drawings.

Figure 2:
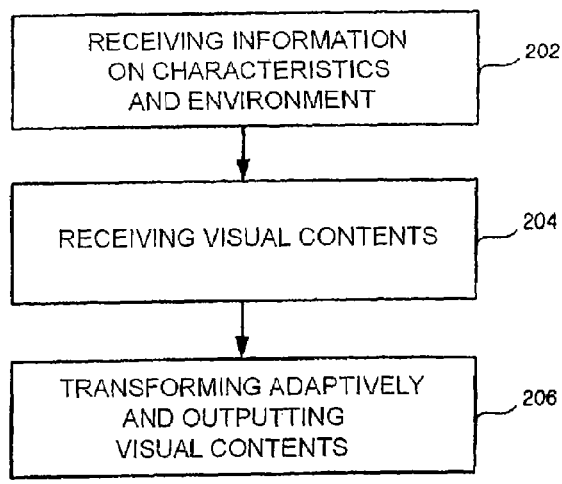
FIG. 2 is a flowchart of an adaptation process according the present invention.

FIG. 1 is a block diagram of an adaptation system in accordance with an embodiment of the present invention. FIG. 2 is a flowchart of the adaptation method in accordance with the present invention, in which the adaptation is a processing step that is specifically executed in a processing section 102 shown in FIG. 1. As shown in FIG. 1, an adaptation system 100 is implemented to include a processing section 102, an input section 103, a database 104, a network interface 106, and an image display device 108. The processing section 102 comprises a dichromacy adaptation section 110 and an anomalous trichromacy adaptation section 112.

The user inputs the user own information on color vision characteristics and environment to the processing section 102 through an input device 103 such as a keyboard (step 202). The processing section 102 receives the information on the color vision characteristics through the input device 103 and stores it in the database 104 in a predetermined format, thereby initializing the adaptation system 100. The information prepared and stored in a predetermined format for the color vision characteristics of the user is called a color vision characteristic descriptor 114. The visual contents are provided from an external network 107 to the processing section 102 through the network interface 106 such as a modem (step 204). The processing section 102 determines whether the user is an anomalous trichromat or a dichromat with reference to the color vision characteristic descriptor 114 in the database 104. If it is determined that the user is a dichromat, the processing section 102 drives the dichromacy adaptation section 110, so that the provided visual contents are adaptively transformed to be suitable for the color vision characteristics of the user by using the information on the color vision characteristics and/or environment contained in the color vision characteristic descriptor 114, and then the transformed visual contents are displayed through an image display device 108 such as a liquid crystal display device (hereinafter, referred to as "LCD") or CRT. If the user is determined as an anomalous trichromat, the processing section 102 drives the anomalous trichromacy adaptation section 112, so that the provided visual contents are adaptively transformed to be suitable for the color Vision characteristics of the user and displayed through the image display device 108 (step 206).

In the Gazette of U.S. Pat. No. 6,362,830, a matrix [A'] displaying the color vision characteristics of humans having a color vision deficiency is dimly derived. However, there is no correct recognition of the problem of singularity for matrix [A']. In the case of a dichromat, an inverse transform function of matrix [A'] does not exist due to the problem of singularity for matrix [A']. Therefore, it was impossible to try the adaptation using the inverse transform function of the matrix [A'] in the Gazette of U.S. Pat. No. 6,320,830. The present invention uses a differential approaching method by differentiating an anomalous trichromat and a dichromat in the process of the adaptation in consideration of the fact that the inverse transformation function of matrix [A'] exists in the case of an anomalous trichromat.

Figure 3:
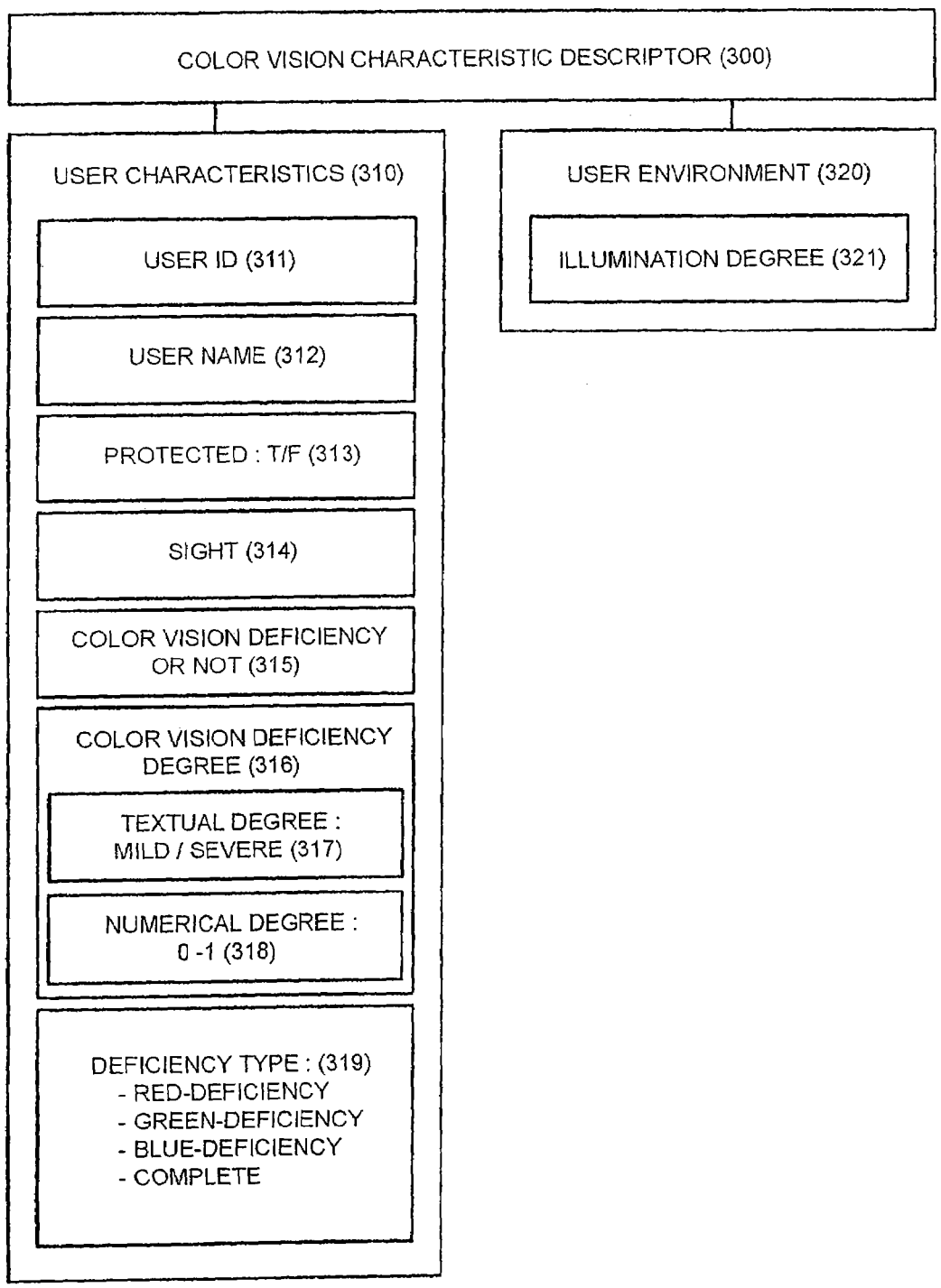
FIG. 3 is a structure view of a user color vision characteristic descriptor in accordance with an embodiment of the present invention.

FIG. 3 is a structure view of a user color vision characteristic descriptor in accordance with an embodiment of the present invention. As shown in FIG. 2, a user color vision characteristic descriptor 300 comprises a user characteristic descriptor 310 and a user environment element descriptor 320. The user characteristic descriptor 310 contains a user identification number (hereinafter, referred to as "ID") (311) for confirming the user, a user name 312 for confirming the user name, information on whether to open individual information 313 for protecting individual information. In addition, the user characteristic descriptor 310 includes a descriptor 314 for indicating the eyesight of the user, a color vision deficiency presence descriptor 315 for describing whether the user has a color vision deficiency, a color vision deficiency type descriptor 316 for describing the user color vision deficiency type, and a color vision deficiency degree descriptor 317 for describing a degree of deficiency for the color vision. The user environment element descriptor 320 comprises a user surrounding illumination degree descriptor 321.

The user characteristic descriptor 310 is described in Table 1 below. The dichromat is subdivided into red color blindness (protanopy), green color blindness (deuteranopy) and blue color blindness (tritanopy). For protanopy or deuteranopy that is the most common among dichromats, the middle green of the spectrum is seen as colorless or gray, the shorter wavelength side is seen as blue and the longer wavelength side is seen as yellow. Therefore, the colors visible from a monitor, a television set or the like are shown in only the two colors of blue and yellow; it is difficult to discriminate well a signal light. Contrary to this, trianopy is extremely rare. With trianopy, every thing is seen in the two colors of red and green; it is unexpectedly easy to discriminate a signal light. Meanwhile, if all three types of cone cells do not exist, it is called achromatopsia. In such a case, the eyesight is very poor because all colors are seen as black or gray.

The anomalous trichromat is subdivided into protanomaly, deuteranomaly, and tritanomaly. Protanomaly or deuteranomaly are the most common among the anomalous trichromats who can see red and green colors of varying degrees. The degrees of protanomaly or deuteranomaly range from severe cases, in which protanomaly or deuteranomaly are not different from protanopy or deuteranopy, to very mild cases, in which protanomaly or deuteranomaly are close to normality. Like the eyesight of humans, color vision deficiencies widely differ in degree.

TABLE 1

| | Color Vision Deficiency Information Type | | |
|---|---|---|---|
| | | Color Vision Deficiency Degree Type | |
| Medical Terminologies | Color Vision Deficiency Type | Textual Degree Type | Numerical Degree Type |
| Protanomaly | Red-deficiency | Mild | 0.1-0.9 |
| Protanopy | Red-deficiency | Severe | 1.0 |
| Deuteranomaly | Green-deficiency | Mild | 0.1-0.9 |
| Deuteranopy | Green-deficiency | Severe | 1.0 |
| Tritanomaly | Blue-deficiency | Mild | 0.1-0.9 |
| Tritanopy | Blue-deficiency | Severe | 1.0 |
| Achromatopsia | Complete Color Blindness | NA | NA |

For example, in the case of protanomaly, in medical terminology, the color vision deficiency type descriptor 319 indicates red deficiency, and the color vision deficiency degree descriptor 316 is expressed as Mild (anomalous trichromacy) in textual description and having a value from 0 to 0.9 in numerical description in the case of anomalous trichromacy, and is expressed as Severe (dichromat) in textual description and having a value of 1.0 in the case of dichromat. That is, the severity of color vision deficiency degree may be described not only by normalized numerical values, but also by textual description. The specific necessity of Such a description method will be described later.

The present invention provides three methods for enumerating the severity of color vision deficiency degree. The first method for enumerating the severity of color vision deficiency degree is to measure abnormal elements inducing anomalous trichromacy and to directly use the measured values. One of the abnormal elements inducing anomalous trichromacy is the case in which the response function of the corresponding cone cells is shifted from normal position, and the other is the case in which the intensity of the response value of the cone cells decreases. The severity of anomalous trichromacy is determined by compositely combining the above two phenomena. The procedures for enumerating the above two cases are performed as expressed by Equation 1 and Equation 2, respectively.

If the enumerated value of the shift of cone cells among the LMS cone cells is Z, the value of Z is expressed like Equation 1. If the maximum shift limit numerical value of medically verified cone cells is $\alpha_{max}$ nanometers (nm), and the shifted value of cone cells of the anomalous trichromacy is $\alpha$ nanometers, the value of $\alpha$ may be ranged from 0.0 to $\alpha_{max}$ nanometers.

$$Z = \frac{\alpha}{\alpha_{max}} \qquad \text{Equation 1}$$

Here, if the shifted value of abnormal cone cells, $\alpha$, exceeds $\alpha_{max}$ or if the cone cells do not exist, it is determined as dichromacy and the value of $\alpha$ is made to be equal to the value of $\alpha_{max}$. Therefore, the value of Z is always 1.0 in the case of dichromacy.

In addition, the method for considering the case in which the intensity of response value of abnormal cone cells among the LMS cone cells decreases is performed in Equation 2. If the maximum threshold numerical value of decrease of medically verified cone cells is $\beta_{max}$, and the decrease value of the cone cells of anomalous trichromacy is $\beta$, the value of $\beta$ may be ranged from 0.0 to the value of $\beta_{max}$. As a result, the value of I is normalized to have a value from 0.0 to 1.0 and is determined by Equation 2.

$$I = \frac{\beta}{\beta_{max}} \qquad \text{Equation 2}$$

Here, if the decreased intensity of abnormal cone cells, $\beta$, exceeds $\beta_{max}$ or if the cone cells do not exist, it is determined as dichromat and the value of $\beta$ is made to be equal to the value of $\beta_{max}$. Therefore, the value of I is always 1.0 in the case of dichromacy.

As a result, the two elements for determining the severity of color vision deficiency degree can be enumerated by using Equation 1 and Equation 2. The color vision deficiency is induced medically through various combinations of the two elements. Therefore, it is possible to more correctly reflect and enumerate the severity of color vision deficiency degree of a human with a color vision deficiency by giving a weighted value to Z, an enumerated value of the shifted extent of abnormal cone cells, and I, an enumerated value of decrease degree in the response intensity of abnormal cone cells, respectively.

Therefore, the moving phenomena of cone cells is expressed by $Z_W$, in Equation 3, wherein $Z_W$ is obtained by the product of Z and $W_Z$, in which Z is the value enumerated from the shift of abnormal cone cells expressed by Equation 1 and $W_Z$ is a weighted value.

$$Z_W = w_Z \times Z = w_Z \times \frac{\alpha}{\alpha_{max}} \qquad \text{Equation 3}$$

In addition, the decrease in the intensity of the response value of the cone cells is also expressed by $I_W$ in Equation 4, wherein $I_W$ is obtained by the product of I and $W_I$, in which I is the value enumerated from the decrease degree in the intensity of the response value of abnormal cone cells expressed by Equation 1 and $W_I$ is a weighted value.

$$I_W = w_I \times I = w_I \times \frac{\beta}{\beta_{max}} \qquad \text{Equation 4}$$

As a result, in Equation 5, the severity of color vision deficiency is obtained by combining the two elements of given weighted values.

$$\begin{aligned} N &= \left\lfloor \frac{Z_W + I_W}{w_Z^{max} + w_I^{max}} \right\rfloor \qquad \text{Equation 5} \\ &= \left\lfloor \frac{w_Z \times Z + w_I \times I}{w_Z^{max} + w_I^{max}} \right\rfloor \\ &= \left\lfloor \left\{ w_Z \times \left( \frac{\alpha}{\alpha_{max}} \right) + w_I \times \left( \frac{\beta}{\beta_{max}} \right) \right\} / (w_Z^{max} + w_I^{max}) \right\rfloor \end{aligned}$$

Here, the value of N is a numerical value indicating the degree of color vision and normalized from 0.0 to 1.0. The value of N is obtained by adding the value obtained by the product of Z and the weighted value, $W_Z$, to the value obtained by the product of I and the weighted value, $W_I$, and then normalizing the resultant value from 0.0 to 1.0, wherein Z is the value enumerated from the shifted extent, to which abnormal cone cells have moved to other cone cells among the LMS cone cells of a human with a color vision deficiency, and I is the value enumerated from the decrease degree in response intensity of the abnormal cone cells.

Because the peak values of Z and I are 1.0, the normalization is executed by dividing the above resultant value by the value obtained by adding $W_Z^{max}$ to $W_I^{max}$, wherein $W_Z^{max}$ is the peak value of the weighted value, $W_Z$, and $W_I^{max}$ is the peak value of the weighted value, $W_I$. Finally, the numerical description value of color vision deficiency degree is obtained by moving the decimal point one place to the right and cutting away lower fractions by one half. Consequently, as shown in Table 1, the numerical description value of color vision deficiency degree is 1.0 in the case of dichromat. In the case of anomalous trichromat, the numerical description value is in the range of 0.0 to 0.9.

The second and third methods for enumerating the degree of color vision deficiency use the results of a color vision deficiency test unlike the first method. The methods for testing color vision deficiency are divided into pseudoisochromatic tests, color arrangement tests, and color light tests. The most representative testing method among the pseudoisochromatic tests is the Ishihara test. This method is most generally used among the testing methods because it is very easy and rapid. However, there is a disadvantage in that it is difficult to test the degree of color vision deficiency in detail. The color arrangement tests have a disadvantage in that the time required in testing is long and the analysis of color vision deficiency is difficult when compared to the pseudoisochromatic tests. However, the color arrangement tests have an advantage in that it is possible to correctly test the type and degree of color vision deficiency when compared to the pseudoisochromatic tests. The most representative test among the color arrangement tests is Farnsworth-Munsell (FM) hue test. Finally, there are anomaloscope tests that use color light. These tests are known as being the most capable in accurately examining red-green anomalous trichromat. In particular, these tests easily subdivide the degree of color vision deficiency.

In accordance with the second method of the present invention, the present invention uses the FM hue test for enumerating the degree of color vision deficiencies. The degree in the severity of color vision deficiency is enumerated by using the total error score (TES) acquired after the FM hue examination. The degrees in the severity of color vision deficiencies are enumerated from 0.1 to 1.0 in accordance with the total error score in Equation 6:

$$N = \begin{cases} \left\lfloor \frac{E - E_{min}}{E_{max} - E_{min}} \right\rfloor, & E_{min} < E < E_{max} \\ 1.0, & E \geq th_{max} \end{cases} \quad \text{Equation 6}$$

Figure 4:
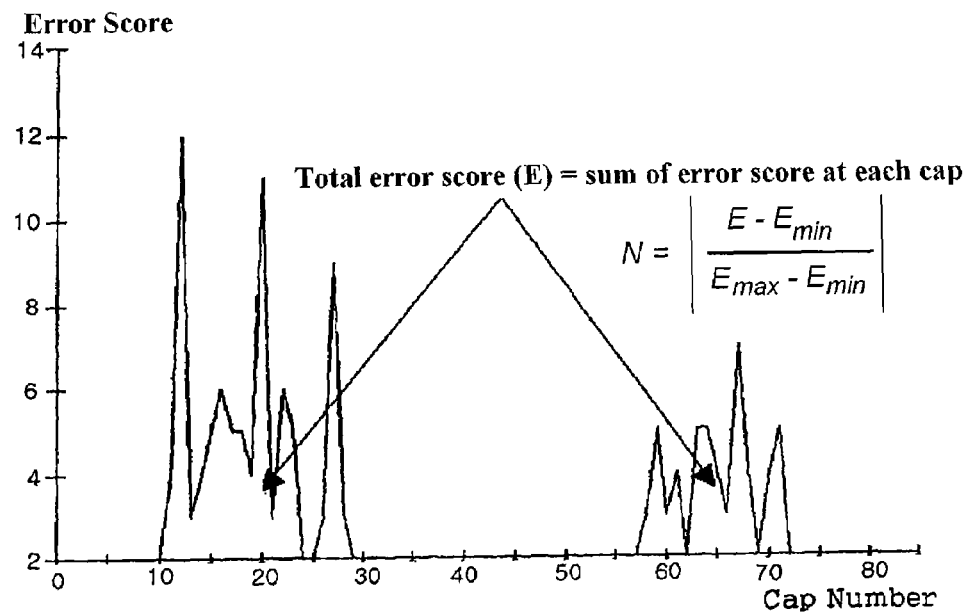
FIG. 4 is a view showing an example of enumerating the degree of deficiency for color vision by using the results of the Farnsworth-Munsell test.

Here, E is the total error score. If the total error score is smaller than $E_{min}$, it is determined that the subject is normal without any color vision deficiency. If the total error score is larger than $E_{min}$, it is determined that the subject has a color vision deficiency. If the total error is larger than $E_{min}$ but smaller than $E_{max}$, it is determined that the subject has an anomalous trichromat deficiency. In anomalous trichromat deficiencies, the numerical value N of the color vision deficiency degree is determined by the proportion occupied by the total error score of the subject in the entire range of the total error score. In this case, the numerical value N of the color vision deficiency degree has a value from 0.1 to 0.9. These numerical values are obtained by cutting away lower fractions by one half and moving the decimal point two places to the right. And, in the case of dichromat deficiencies, the numerical value N of the color vision deficiency degree is always 1.0. FIG. 4 shows an example of the methods for enumerating color vision deficiency degrees using the FM hue test.

In accordance with the third method, the present invention uses an anomaloscope for enumerating the color vision deficiency degrees. Nowadays, anomaloscopes can be used only for examining red-green anomalous trichromacy. The present invention enumerates the color vision deficiency degree using a Nagel anomaloscope that is the most representative anomaloscope. The Nagel anomaloscope consists of two parts. The first part is a test field, in which a pure yellow color is emitted, and the second part is a mixture field, in which a red color and a green color are jointly emitted and produce a yellow color. The Nagel anomaloscope is provided with two adjustment devices: The first adjustment device is used to adjust the illumination of the test field and the second adjustment device is used to adjust the ratio of red to green in the mixture field.

The subject should adjust the colors emitted from the test field and the mixture field to be identical, using the two adjustment devices while viewing the anomaloscope with both eyes. The examiner determines the degree of severity and the type of the color vision deficiency by analyzing the values of the two adjustment devices adjusted by the subject. The ratio of red to green has a value from 0 to 73. 0 indicates a pure green color and 73 indicates a pure red color. The numerical range of 1 to 72 indicates a mixed color generated by adding red to green. The proportion occupied by red in the mixed color increases as the value decreases while the proportion occupied by green in the mixed color increases as the value increases. The numerical value is usually set to 43 before initiating the test and thus a yellow color is generated in the mixture field. If the value of the subject ranges from 40 to 45, the subject is determined as normal. The degree in the severity of the color vision deficiency is enumerated from 0.1 to 1.0 in Equation 7.

$$N = \begin{cases} \left\lfloor \frac{R_d}{R_{th}} \right\rfloor, & R_d \leq R_{th} \\ 1.0, & R_d > R_{th} \end{cases} \quad \text{Equation 7}$$

Here, $R_d = R_{max} - R_{min}$, $$R_{th} = \begin{cases} R_{min}^{normal}, & \text{green color vision deficiency} \\ 73 - R_{max}^{normal}, & \text{red color vision deficiency} \end{cases}$$

Figure 5:
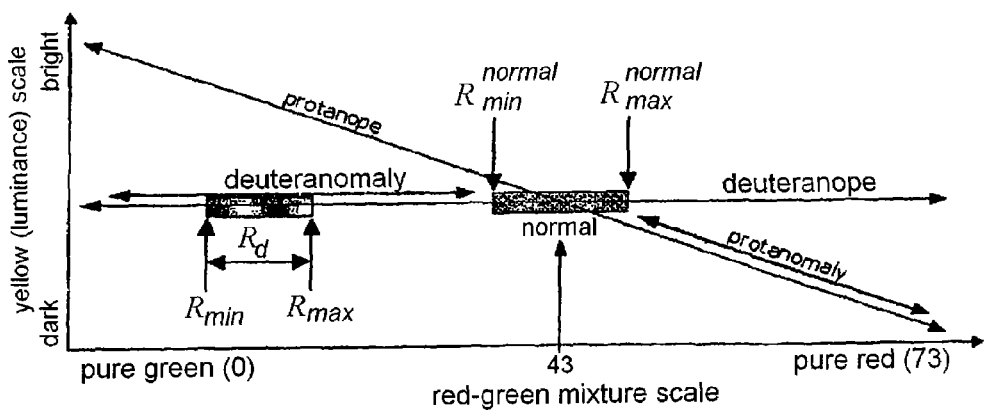
FIG. 5 is a view showing an example for enumerating the degree of deficiency for color vision by using the results of the Nagel Anomaloscope test.

In Equation 7, $R_d$ indicates the range of the red/green ratio section in the mixture field, which is recognized as identical to the test field of the subject. That is, $R_d$ indicates the distance between the minimum value, $R_{min}$, and the maximum value, $R_{max}$, in the red/green ratio section range. The larger the value of $R_d$, the more severe the degree of the color vision deficiency. A normal human has the minimum value of $R^{normal}_{min}$ and the maximum value of $R^{normal}_{max}$ in the red/green ratio section range. That is, the value of $R_d$ is the value of ($R^{normal}_{max} - R^{normal}_{min}$). As a result of performing the anomaloscope test, if the distance value, $R_d$, is smaller than the limit value, $R_{th}$, it is determined that the user has the deficiency of anomalous trichromacy; and if $R_d$ is larger than $R_{th}$, it is determined that the user has the deficiency of dichromacy. In accordance with the types of color vision deficiencies, the limit value, $R_{th}$, varies. In the case of green-color vision deficiency, the limit value $R_{th}$ equals $R^{normal}_{min}$ and in the case of red-color vision deficiency, the limit value $R_{th}$ equals ($73 - R^{normal}_{max}$). Using these numerical values, the numerical value of the color vision deficiency degree, N, is determined by the ratio between $R_{th}$ and $R_d$ in the case of anomalous trichromacy, wherein $R_{th}$ is the longest distance in the red/green ratio section range in which the color vision deficiency is determined as dichromacy, and $R_d$ is the distance within the red/green ratio section range of the subject. In this case, the numerical value of the color vision deficiency degree, N, has a value from 0.1 to 0.9. These values are obtained by cutting away lower fractions by one half moving the decimal point two places to the right. In the case of dichromacy, the color vision deficiency degree, N, is always 1.0. FIG. 5 shows an example of the method for enumerating the color vision deficiency degree using the results of the anomaloscope test. Following Table 2 is an example of the color vision deficiency descriptor prepared in a XML document, in which the descriptor has the structure shown in FIG. 3.

Table 2a

```xml
<!-- ############################################ -->
<!--    Definition of VisualImpairmentType        -->
<!-- ############################################ -->
<complexType name="VisualImpairmentType">
        <sequence>
                <element name="ColorVisionDeficiency" type="ColorVisionDeficiencyType"
    minOccurs="0"/>
                </sequence>
        <attribute name="ColorVisionDeficiencyOrNot" type="boolean" use="required"/>
</complexType>
```

Table 2b

```xml
<!-- ############################################ -->
<!--    Definition of ColorVisionDeficiency       -->
<!-- ############################################ -->
<complexType name="ColorVisionDeficiencyType">
        <sequence>
                <element name="ColorVisionDeficiencyType"
        type="ColorVisionDeficiencyTypeType"/>
                <element name="ColorVisionDeficiencyDegree"
        type="ColorVisionDeficiencyDegreeType"/>
        </sequence>
        <attribute name="Sight" type="float" use="optional"/>
        <attribute name="IlluminanceDegree" type="float" use="optional"/>
</complexType>
<simpleType name="ColorVisionDeficiencyTypeType">
        <restriction base="string">
                <enumeration value="Red-Deficiency"/>
                <enumeration value="Green-Deficiency"/>
                <enumeration value="Blue-Deficiency"/>
                <enumeration value="CompleteColorBlindness"/>
        </restriction>
</simpleType>
<complexType name="ColorVisionDeficiencyDegreeType">
    <choice>
        <element name="NumericDegree" type="mpeg7:zeroToOneType"/>
        <element name="TextualDegree">
                <simpleType>
                <restriction base="string">
                        <enumeration value="Severe"/>
                <enumeration value="Mild"/>
                  </restriction>
                </simpleType>
        </element>
    </choice>
</complexType>
```

Figure 6:
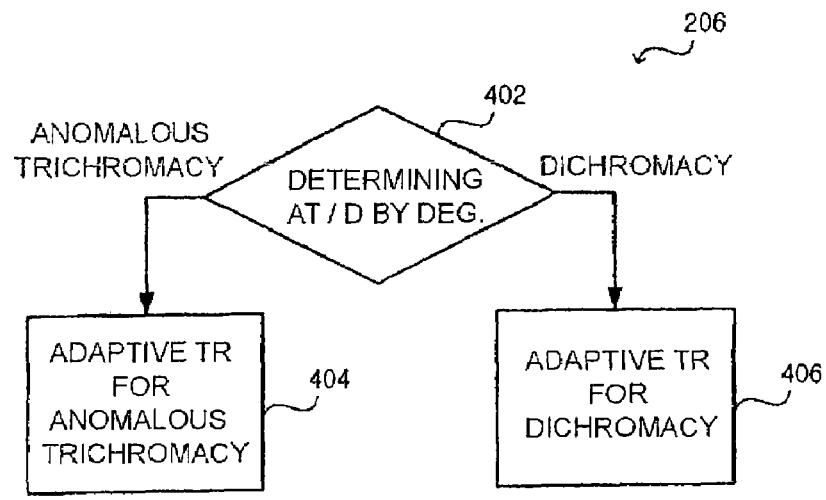
FIG. 6 is a detailed flowchart which shows an example of the adaptation step of FIG. 2.

FIG. 6 is a detailed flowchart of the adaptation step (step 206) shown in FIG. 2. As shown in FIG. 6, the color vision deficiency degree of the user is determined from the color vision characteristic descriptor as described above (step 402). If the user is determined as an anomalous trichromat as the result of the determination, an adaptation process is executed for such an anomalous trichromat (step 404). If the user is determined as a dichromat, a separate adaptation process is executed for such a dichromat (step 406). If the textural description 317 of the color vision degree descriptor 316 is "Severe" (dichromat) or a numerical description 318 is 1.0 in FIG. 3, the user is a dichromat among the color vision deficiencies, and thus the adaptation process is performed. Whereas, if the textural description 317 of the color vision deficiency of the color vision deficiency degree descriptor 316 is "Mild" (anomalous trichromacy) or the numerical description 318 is 0-0.9, the user is an anomalous trichromat among the color vision deficiencies, and thus the adaptation process for the anomalous trichromat is performed.

Figure 7:
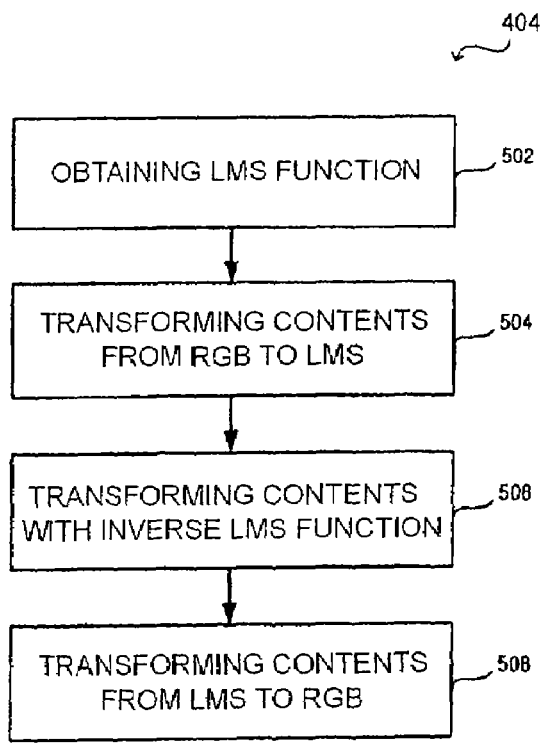
FIG. 7 is a detailed flowchart which shows an example of the adaptation step of anomalous trichromacy of FIG. 6.

FIG. 7 is a detailed flowchart of an example of the adaptation process for an anomalous trichromat (step 404). At first, an LMS response function expressing the vision characteristics of the user, who is an anomalous trichromat, is obtained (step 502). The method for obtaining the LMS response function will be specifically described below. Next, the externally inputted visual contents are transformed from the RGB color space to the LMS color space (step 504). Then, the inputted visual contents are transformed using the inverse function of the user LMS response function (step 506), and the visual contents transformed in this manner in the LMS space is transformed to the ROB color space again (step 508).

Figure 8:
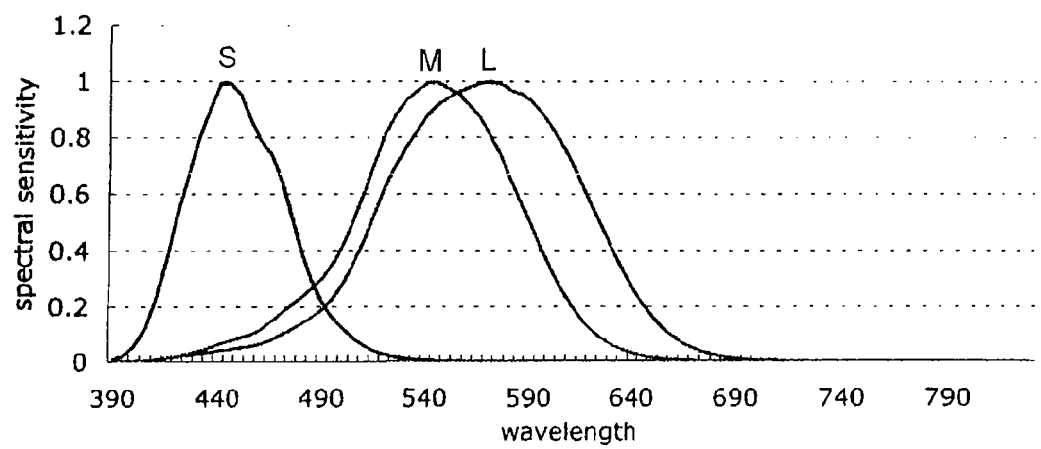
FIG. 8 is a view showing the spectral sensitivity of LMS cone cells of a normal human.

Next, the principle of the adaptation method of an anomalous trichromat in accordance with the present invention is specifically described with reference to FIGS. 8 to 11. FIG. 8 shows the spectral sensitivity of the LMS cone cells for the visible wavelengths of a normal human.

Figure 9:
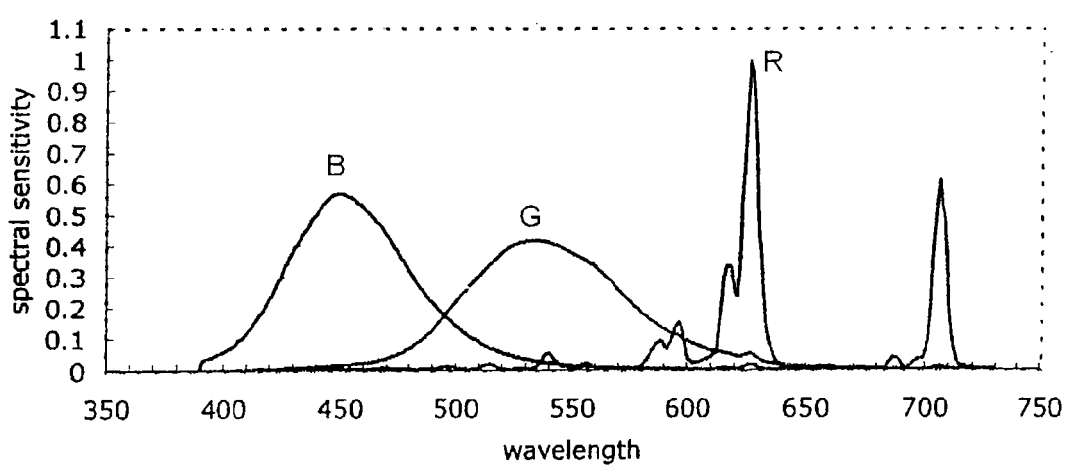
FIG. 9 is a view showing a RGB emission curve of a CRT monitor with P22 phosphor.

FIG. 9 shows the RGB emission curves of a CRT monitor with P22 phosphor. As described above, a human discriminates colors by visual cells in the eyes that recognize light reflected from an object. However, when a human recognizes colors through an image display device, unlike the case in which a human recognizes colors by directly viewing the object, the colors are recognized differently due to the characteristics of the image display device and the characteristics of each individual's eyes. Therefore, in order to allow the human to accurately grasp the finally recognized colors, the characteristics of the spectral emission function of the corresponding image display device should be considered. In general, the characteristics of the spectral emission function of an image display device can be measured by using a spectroradiometer, in which those characteristics appear differently in accordance with the characteristics and the types of image display devices. In this embodiment, the characteristics of the RGB emission function of a CRT monitor with P22 phosphor are measured using a spectroradiometer.

Figure 10:
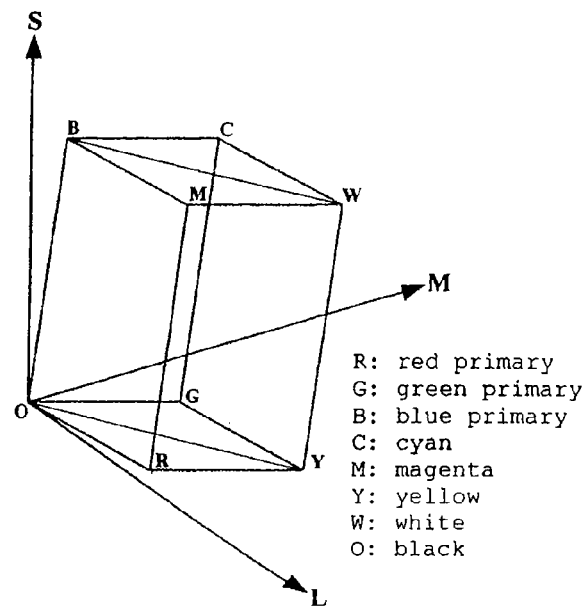
FIG. 10 is a view showing the stimuli in the LMS color space.

FIG. 10 expresses stimuli in the LMS color space. The colors measured with a spectroradiometer are not equal to those recognized by a human. The former is merely a physical measurement of colors. The colors finally recognized by a human are a result of a composite reaction between the LMS characteristics of cone cells and the RGB characteristics of an image display device. The colors emitted from the image display device are transformed and recognized in accordance with the characteristics of the three types of cone cells. FIG. 10 expresses each of the RGB values recognized by the three types of cone cells on LMS orthogonal coordinate system. All colors are recognized, using an image display device, are present in the hexahedron formed by the points ORYGB-MWC.

The LMS values ($L_Q$, $M_Q$, $S_Q$) of an optional stimulus Q can be transformed by a transformation matrix that is obtained by integrating the LMS function of cone cells (FIG. 8) and the RGB spectrum emission curves measured with a spectroradiometer (FIG. 9) in accordance with each wavelength. The equation for obtaining the LMS transformation matrix of a normal human, $T_{normal}$, is expressed in Equation 8 below.

$$\begin{bmatrix} L \\ M \\ S \end{bmatrix} = T_{normal} \cdot \begin{bmatrix} R \\ G \\ B \end{bmatrix}, T_{normal} = \begin{bmatrix} L^r_{normal} & L^g_{normal} & L^b_{normal} \\ M^r_{normal} & M^g_{normal} & M^b_{normal} \\ S^r_{normal} & S^g_{normal} & S^b_{normal} \end{bmatrix},$$

$$\text{where} \begin{cases} L^r = k_l \int E_r(\lambda)L(\lambda)d\lambda & L^g = k_l \int E_g(\lambda)L(\lambda)d\lambda & L^b = k_l \int E_b(\lambda)L(\lambda)d\lambda \\ M^r = k_m \int E_r(\lambda)M(\lambda)d\lambda & M^g = k_m \int E_g(\lambda)M(\lambda)d\lambda & M^b = k_m \int E_b(\lambda)M(\lambda)d\lambda \\ S^r = k_s \int E_r(\lambda)S(\lambda)d\lambda & S^g = k_s \int E_g(\lambda)S(\lambda)d\lambda & S^b = k_s \int E_b(\lambda)S(\lambda)d\lambda \end{cases}.$$

Equation 8

In Equation 8, $E_r(\lambda)$, $E_g(\lambda)$, and $E_b(\lambda)$ indicate spectrum powers emitted by an image display device at a wavelength ($\lambda$) in connection with R, G, and B stimuli, respectively, and $L(\lambda)$, $M(\lambda)$, and $S(\lambda)$ indicate spectral response values absorbed by cone cells at the wavelength ($\lambda$). The maximum emission value of each phosphor in an image display device forms a neutral LMS response value. Each neutral response value should have an ideal emission function characteristic in order to form a white point. If an image display device has such an ideal condition, the K value is selected to satisfy $\Sigma L=\Sigma M=\Sigma S=1$.

Figure 11:
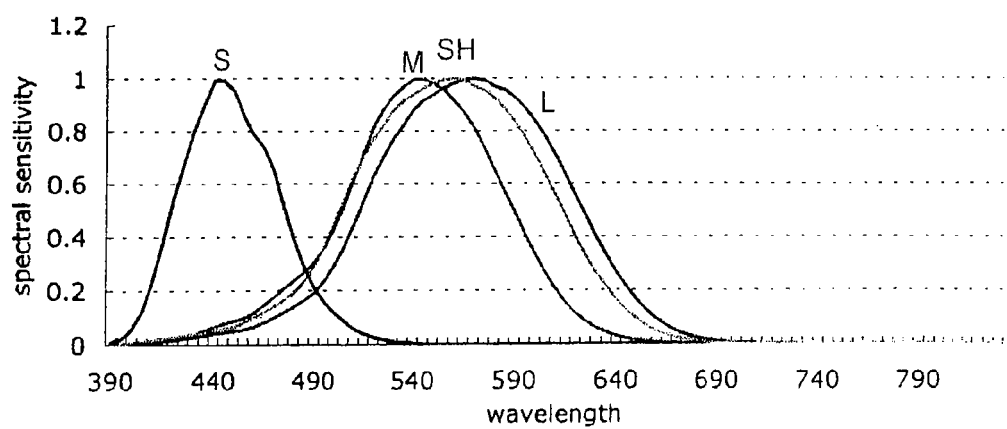
FIG. 11 is a view showing the spectral sensitivity of protanomaly in which the peak sensitivity of L cone cells moves about 10 nm.

FIG. 11 shows the spectral sensitivity of protanomaly, in which the peak sensitivity of cone cells is shifted about 10 nm. Unlike dichromacy, anomalous trichromacy is the state in which all three types of cone cells exist, but they do not exert normal function. Because the difference in accordance with the degree of anomalous trichromacy is varied, unlike that of dichromacy, it is very difficult to accurately express the colors recognized by an anomalous trichromat. However, in accordance with several papers studying eyesight, in the case of anomalous trichromacy, it is assumed that the peak sensitivity of the LMS cone cells is shifted by a certain wavelength. Because the L-cone cell is shifted in protanomaly, the M-cone cells are shifted in deuteranomaly, and the S-cone cells are shifted in tritanomaly, two types of cone cells are more overlapped than those in a normal human. Therefore, an anomalous trichromat lacks the capability of discriminating colors when compared to a normal human. FIG. 11 shows the spectral sensitivity of protanomaly, in which the peak sensitivity of the L-cone cells is shifted about 10 nm.

Unlike the simulation of dichromacy, color simulation recognized by an anomalous trichromacy can be directly obtained by the transformation matrix that transforms light emitted from an image display device into the colors recognized by defected cone cells of an anomalous trichromat. Transformation matrixes are obtained in accordance with the type of anomalous trichromacy; protanomaly is given the transformation matrix $T^L_{abnormal}$ in Equation 9, deuteranomaly is given the transformation matrix $T^M_{abnormal}$ in Equation 10, and tritanomaly is given with the transformation matrix $T^S_{abnormal}$ in Equation 11. That is, it is possible to obtain direct transformation matrixes by applying an LMS response function in deformed cone cells of an anomalous trichromat instead of an LMS response function of a normal human to Equation 8.

However, for such an approach, the enumeration for the LMS transformation matrix $T_{abnormal}$ of a human with a color vision deficiency should precede. As apparent in FIG. 8, in order to enumerate $T_{abnormal}$, it is necessary to know the spectral response functions $L'(\lambda)$, $M'(\lambda)$, and $S'(\lambda)$ in cone cells of a human with a color vision deficiency along with the characteristics $E_r(\lambda)$, $E_g(\lambda)$, and $E_b(\lambda)$ of the display. However, an important problem in practice is how to obtain $L'(\lambda)$, $M'(\lambda)$, and $S'(\lambda)$. Even if it becomes possible to measure those characteristics by an expert, a problem still remains in that a method should be devised for inputting the measured data into an adaptation system for use in an adaptation.

As described in reference to Equation 1 through Equation 5, the present invention proposes a method for expressing the degree of anomalous trichromacy with simple numerical values by modeling the mechanism of anomalous trichromacy in consideration of the spectral transition of LMS cone cells and the variation of the response intensity. The simplified numerical values for the degree of anomalous trichromacy are very effectively used to approximate the spectral response functions $L'(\lambda)$, $M'(\lambda)$, and $S'(\lambda)$ of the cone cells of anomalous trichromats together with the information on the types of anomalous trichromacy. Through these procedures, it becomes possible to enumerate $T_{abnormal}$ and thus to very easily and effectively express color vision deficiency of an anomalous trichromat for the first time.

Here, the response functions of defected cone cells of an anomalous trichromat include the cases in which one type of LMS cone cells is shifted toward any other type of cone cell by several nm to tens of nm and in which the response degree of the LMS cone cells decreases.

The original color image information i.e. (R, G, B) is directly transformed to (L', M', S') in the LMS space by using an LMS transformation matrix of each anomalous trichromat, and in the transformation procedure, protanomaly is expressed in Equation 9, deuteranomaly is expressed in Equation 10, and tritanomaly is expressed in Equation 11.

Equation 9

$$\begin{bmatrix} L' \\ M' \\ S' \end{bmatrix} = T^L_{abnormal} \cdot \begin{bmatrix} R \\ G \\ B \end{bmatrix},$$

$$T^L_{abnormal} = \begin{bmatrix} L^r_{abnormal} & L^g_{abnormal} & L^b_{abnormal} \\ M^r_{normal} & M^g_{normal} & M^b_{normal} \\ S^r_{normal} & S^g_{normal} & S^b_{normal} \end{bmatrix}$$

Equation 10

$$\begin{bmatrix} L' \\ M' \\ S' \end{bmatrix} = T^M_{abnormal} \cdot \begin{bmatrix} R \\ G \\ B \end{bmatrix},$$

$$T^M_{abnormal} = \begin{bmatrix} L^r_{normal} & L^g_{normal} & L^b_{normal} \\ M^r_{abnormal} & M^g_{abnormal} & M^b_{abnormal} \\ S^r_{normal} & S^g_{normal} & S^b_{normal} \end{bmatrix}$$

Equation 11

$$\begin{bmatrix} L' \\ M' \\ S' \end{bmatrix} = T^S_{abnormal} \cdot \begin{bmatrix} R \\ G \\ B \end{bmatrix},$$

$$T^S_{abnormal} = \begin{bmatrix} L^r_{normal} & L^g_{normal} & L^b_{normal} \\ M^r_{normal} & M^g_{normal} & M^b_{normal} \\ S^r_{abnormal} & S^g_{abnormal} & S^b_{abnormal} \end{bmatrix}$$

A color stimulus value transformed to (L', M', S') in the LMS space is transformed again by an LMS inverse transformation matrix in a normal human in Equation 12, whereby it is possible to obtain the colors in RGB values practically recognized by an anomalous trichromat. By this method, it is possible to simulate the colors seen by anomalous trichromats, in Equation 12, so that normal humans are capable of seeing the colors. At first, the original color information, i.e. (R, G, B) is transformed to (L', M', S') using the LMS transformation matrix of anomalous trichromats in Equation 12(1), and then the transformed (L', M', S') is transformed to (R$_{simulated}$, G$_{simulated}$, B$_{simulated}$) which is recognized by anomalous trichromats by multiplying the transformed (L', M', S') by the LMS inverse transformation matrix in normal humans, thereby executing the simulation. If Equation 12(1) and Equation 12(2) are combined, it is possible to execute color simulation for anomalous trichromats using Equation 12(3). In general, the colors simulated for anomalous trichromats, in Equation 12(4), are not identical to the original colors. The more severe the degree of anomalous trichromacy, the greater the difference between the simulated colors and the original colors.

Equation 12

$$\begin{bmatrix} L' \\ M' \\ S' \end{bmatrix} = [T_{abnormal}] \cdot \begin{bmatrix} R \\ G \\ B \end{bmatrix} \quad (1)$$

$$\begin{bmatrix} R_{simulated} \\ G_{simulated} \\ B_{simulated} \end{bmatrix} = [T_{normal}]^{-1} \cdot \begin{bmatrix} L' \\ M' \\ S' \end{bmatrix} \quad (2)$$

$$\begin{bmatrix} R_{simulated} \\ G_{simulated} \\ B_{simulated} \end{bmatrix} = [T_{normal}]^{-1} \cdot [T_{abnormal}] \cdot \begin{bmatrix} R \\ G \\ B \end{bmatrix} \quad (3)$$

$$\begin{bmatrix} R_{simulated} \\ G_{simulated} \\ B_{simulated} \end{bmatrix} \neq \begin{bmatrix} R \\ G \\ B \end{bmatrix} \quad (4)$$

An adaptation process for anomalous trichromats is performed in such a manner that the color discriminating capability of anomalous trichromats is further enhanced by emphasizing the brightness and saturation of a color, which is difficult for an anomalous trichromat with a given anomalous trichromacy type to discriminate, to be more intense than normal ones. That is, this is a method to compensate for the decrease in the color discrimination capability of an anomalous trichromat with a given anomalous trichromacy type due to shifted cone cells, and is expressed in Equation 13. Specifically, the adaptively transformed colors, i.e. (R$_{adapted}$, G$_{adapted}$, B$_{adapted}$) are first obtained by multiplying the original colors (R, G, B) by the adaptation matrix [A] in Equation 13(1). Here, the adaptation matrix [A] is applied, so that the result of simulating the adaptively transformed colors (R$_{adapted}$, G$_{adapted}$, B$_{adapted}$) to the colors (R$_{simulated}$, G$_{simulated}$, B$_{simulated}$), which are recognized by the anomalous trichromats, are equal to the original colors (R, G, B) in Equation 13(2).

Equation 13

$$\begin{bmatrix} R_{adapted} \\ G_{adapted} \\ B_{adapted} \end{bmatrix} = [A] \cdot \begin{bmatrix} R \\ G \\ B \end{bmatrix} \quad (1)$$

$$\begin{bmatrix} R_{simulated} \\ G_{simulated} \\ B_{simulated} \end{bmatrix} = [T_{normal}]^{-1} \cdot [T_{abnormal}] \cdot \begin{bmatrix} R_{adapted} \\ G_{adapted} \\ B_{adapted} \end{bmatrix} \quad (2)$$

$$= \begin{bmatrix} R \\ G \\ B \end{bmatrix}$$

That is, the goal of the contents adaptation for anomalous trichromats is to adaptively transform the RGB colors of the original contents, so that a corresponding type of anomalous trichromat can see the contents as a normal human sees the contents. Here, the contents adaptive matrix [A] for anomalous trichromats can be expressed in Equation 14 below. Although the adaptively transformed contents may be very factitious to normal humans, anomalous trichromats can see the adaptively transformed contents at the same or approximate level as normal humans see the original contents.

$$A = [T_{abnormal}]^{-1} \cdot [T_{normal}]$$ Equation 14

Figure 12:
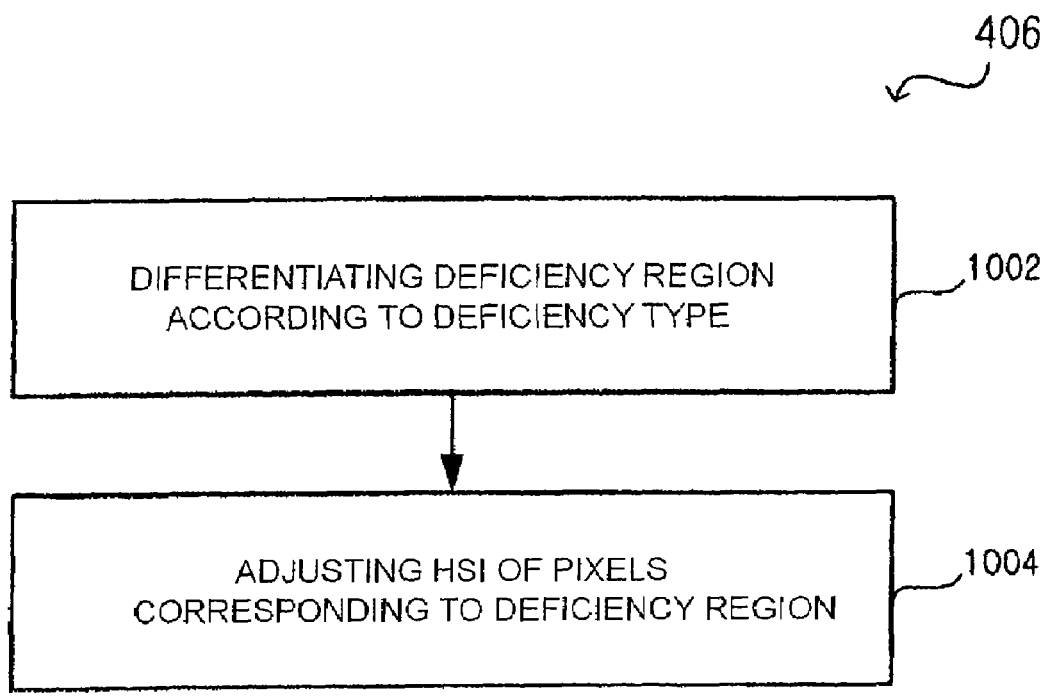
FIG. 12 is a detailed flowchart of an example of the dichromacy adaptation process of FIG. 6.

FIG. 12 is a detailed flowchart of an example of the adaptation process for dichromacy shown in FIG. 6. As shown in the drawing, a deficiency region, which is difficult for the user to detect, is first discriminated in accordance with the color vision deficiency type extracted from the color vision characteristic descriptor (step 1002). Next, at least one of hue, saturation or intensity of the pixels corresponding to the deficiency region is tuned (step 1004). Thereby, the visual contents are adaptively transformed to be suitable for the color vision characteristics of a user with the deficiency of dichromacy. The specific transformation process is described in detail below.

Figure 13A:
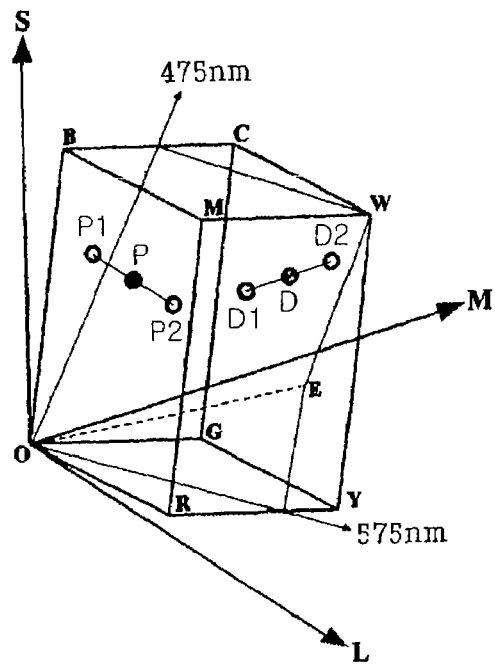
FIG. 13a is a view showing color spaces recognized by a human with a deficiency of protanopy or deuteranopy.
Figure 13B:
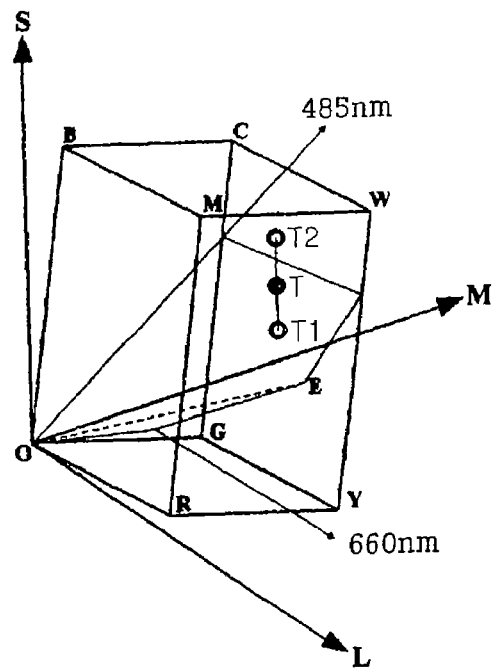
FIG. 13b is a view showing color spaces recognized by a human with a deficiency of tritanopy.

FIG. 13 is a view displaying the color spaces recognized by a human with the deficiency of dichromacy, in which FIG. 13*a* shows that for protanopy or deuteranopy and FIG. 13*b* shows that for tritanopy. To express the colors recognized by humans with color vision deficiencies is essential for an adaptation process for a color vision deficiency. Several papers have already verified simulation processes of expressing colors recognized by dichromats. Humans with the deficiency of protanopy or deuteranopy recognize a color of short wavelength as blue and a color of long wavelength as yellow. Therefore, the colors for humans with the deficiency of protanopy or deuteranopy can be expressed by two colors with various degrees of intensity and saturation. Although it is very seldom, humans with the deficiency of tritanopy recognize a color of short wavelength as cyan and a color of long wavelength as red. Therefore, the colors for humans with the deficiency of tritanopy can also be expressed by two colors with various degrees of intensity and saturation. These two colors will be seen as identical colors for both humans with color vision deficiencies and normal humans. Medically, it is possible to assume that these two colors are blue of 475 nm and yellow of 575 nm for protanopy or deuteranopy and cyan of 485 nm and red of 660 nm for tritanopy.

FIG. 13 expresses the colors recognized by humans with the deficiency of dichromacy. In FIG. 13, point $E(L_E, M_E, S_E)$ is the brightest metamer among the equal-energy stimuli of a corresponding image display device. Therefore, OE indicates neutral stimuli equally recognized by a normal human and a dichromat. Two limited stimulus planes are formed centering on these stimuli. In other words, these planes form two unchangeable colors for given dichromat types. A certain color stimulus Q in the LMS space is substituted with a color on the two planes in accordance with the wavelength thereof. In FIG. 13, the color stimuli of points $P_1$ and $P_2$ of protanopy are all substituted with the color stimulus of point P, and the color stimuli of points $D_1$ and $D_2$ of deuteranopy are all substituted with the color stimulus of point D. Similarly, the color stimuli of points $T_1$ and $T_2$ of tritanopy are all substituted with the color stimulus of point T.

It is assumed that the color stimulus of dichromats substituted from the certain stimulus, Q, is $Q'(L_{Q'}, M_{Q'}, S_{Q'})$. And, it is assumed that the color stimulus forming the two unchangeable color planes is $A(L_A, M_A, S_A)$. The substituted Q' value is always orthogonal to a plane formed by normal vectors. Therefore, the Q' can be expressed in Equation 15. In addition, Equation 15 can be expressed by the linear equations of $L_{Q'}$, $M_{Q'}$, $S_{Q'}$ values in Equation 16.

$$(E \times A) \cdot Q' = 0$$ Equation 15

$$aL_{Q'} + bM_{Q'} + cS_{Q'} = 0$$ Equation 16

Here, $$a = M_E S_A - S_E M_A, \; b = S_E L_A - L_E S_A, \; c = L_E M_A - M_E L_A$$

Therefore, the transformation equations from stimulus Q to Q' are finally expressed in Equation 17 (for protanopy), Equation 18 (deuteranopy), and Equation 19 (tritanopy).

$$\begin{bmatrix} L_{Q'} \\ M_{Q'} \\ S_{Q'} \end{bmatrix} = \begin{bmatrix} 0 & -b/a & -c/a \\ 0 & 1 & 0 \\ 0 & 0 & 1 \end{bmatrix} \begin{bmatrix} L \\ M \\ S \end{bmatrix} = \begin{bmatrix} L_p \\ M_p \\ S_p \end{bmatrix}$$ Equation 17

Here, $$\lambda_A = \begin{cases} 575 \text{ nm}, & SQ/MQ < SE/ME \\ 475 \text{ nm}, & \text{otherwise} \end{cases}$$

$$\begin{bmatrix} L_{Q'} \\ M_{Q'} \\ S_{Q'} \end{bmatrix} = \begin{bmatrix} 1 & 0 & 0 \\ -a/b & 0 & -c/b \\ 0 & 0 & 1 \end{bmatrix} \begin{bmatrix} L \\ M \\ S \end{bmatrix} = \begin{bmatrix} L_d \\ M_d \\ S_d \end{bmatrix}$$ Equation 18

Here, $$\lambda_A = \begin{cases} 575 \text{ nm}, & SQ/LQ < SE/LE \\ 475 \text{ nm}, & \text{otherwise} \end{cases}$$

$$\begin{bmatrix} L_{Q'} \\ M_{Q'} \\ S_{Q'} \end{bmatrix} = \begin{bmatrix} 1 & 0 & 0 \\ -a/b & 0 & -c/b \\ 0 & 0 & 1 \end{bmatrix} \begin{bmatrix} L \\ M \\ S \end{bmatrix} = \begin{bmatrix} L_d \\ M_d \\ S_d \end{bmatrix}$$ Equation 19

Here, $$\lambda_A = \begin{cases} 660 \text{ nm}, & MQ/LQ < ME/LE \\ 485 \text{ nm}, & \text{otherwise} \end{cases}$$

Figure 14:
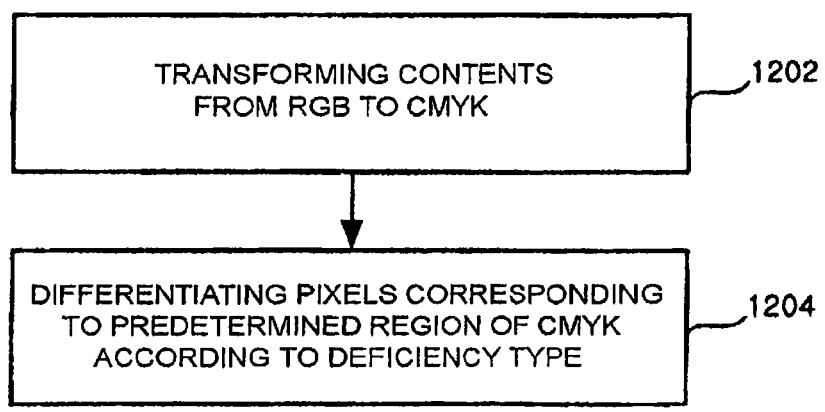
FIG. 14 is a detailed flowchart of an example of a method of discriminating the deficiency region in FIG. 12.

FIG. 14 is a detailed flowchart of an example of the method for discriminating a deficiency region in FIG. 12. As shown in FIG. 14, the visual contents are first transformed from the RGB color space to the CMYK color space in Equation 20 (step 1202). Next, a region to be adaptively transformed is determined (step 1204). This is executed by discriminating the pixels corresponding to a predetermined region of the CMYK in accordance Wraith the color vision deficiency type. In the case of protanopy or deuteranopy, the deficiency region is determined in Equation 21 and in the case of tritanopy, the deficiency is determined in Equation 22.

$$\begin{bmatrix} C \\ M \\ Y \end{bmatrix} = \begin{bmatrix} c \\ m \\ y \end{bmatrix} - K$$ Equation 20

Here, c, m, y are values obtained as the complements of R, G, B, respectively, and are indicated as follows:

$$\begin{bmatrix} c \\ m \\ y \end{bmatrix} = I - \begin{bmatrix} R \\ G \\ B \end{bmatrix}$$

In addition, K indicates the minimum value in (c, m, y). The color deficiency regions $R_{adaptation}(x,y)$ for protanopy or deuteranopy distributed in the space are detected in Equation 21.

$$R_{adaptation}(x, y) = \begin{cases} 1, & \text{when } M(x, y) \geq Th_1 \\ 0, & \text{otherwise} \end{cases} \quad \text{Equation 21}$$

Here, (x, y) indicates positions of pixels in an image. M(x, y) indicates magenta values distributed in the space. $Th_1$ indicates the threshold of values determined as magenta. In the case of tritanopy, the color deficiency region $R_{adaptation}$(x,y) is detected as follows:

$$R_{adaptation}(x, y) = \begin{cases} 1, & \text{when } Y(x, y) \leq Th_2 \\ 0, & \text{otherwise} \end{cases} \quad \text{Equation 22}$$

Here, Y(x,y) indicates the yellow values distributed in the space. $Th_2$ indicates the threshold of the yellow values for finding a blue that is the complementary of yellow using the yellow values.

The adaptation processes for dichromats are divided into an adaptation process for protanopy or deuteranopy and an adaptation process for tritanopy. Humans with protanopy or deuteranopy see all of the colors viewed through an image display device as blue or yellow. That is, the red of long wavelength in the red color region is seen as yellow and the red of short wavelength is seen as blue. Similarly, the green of long wavelength in the green color region is seen as yellow and the green of short wavelength is seen as blue. Therefore, the goal of the adaptation of dichromat is to find the red color and the green color regions that are indistinguishable by humans with protanopy or deuteranopy and to make those regions distinguishable. If only one, either red or green is changed into a color that is distinguishable by humans with a deficiency of protanopy or deuteranopy, the two colors are made to be distinguishable. In general, the pixels of the visual contents consist of three values, RGB (Red, Green, Blue), and these values have hue, saturation, and intensity. Therefore, the inherent color of the pixels is just hue. Even if the pixels have a same hue, they are expressed differently by the intensity or saturation.

In the process of contents adaptation for dichromats, the HSI (Hue, Saturation, Intensity) color space is used in order to tune the hues and intensities of colors. The HSI color space is known to be useful to divide an object of an image. Therefore, the adaptation process is performed in such a manner that the RGB colors are transformed into the HSI color space to obtain object information on an image, and the colors indistinguishable by the dichromats are changed.

Figure 15:
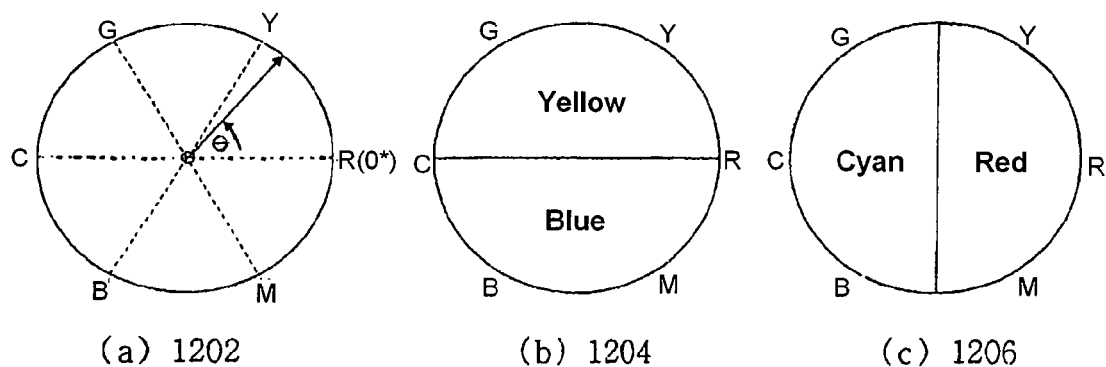
FIG. 15 is a view showing hues recognized by a normal human, a human with a deficiency of protanopy or deuteranopy, and a human with a deficiency of tritanopy, respectively.

FIG. 15a indicates the hues (1302) of colors recognized by normal humans. Here, Θ means a hue angle, and red R is distributed to 360°, in the counterclockwise direction in reference to 0°. Typically, yellow (Y) is positioned at the point of 60°, green (G) is positioned at the point of 120°, cyan is positioned at the point of 180°, blue is positioned at the point of 240° and magenta (M) is positioned at the point of 300°.

However, unlike normal humans, dichromats recognize all colors recognized by normal humans as two hues. FIG. 15b indicates the hues (1304) recognized by protanopy or deuteranopy. FIG. 15c indicates the hues (1306) recognized by tritanopy. That is, dichromats discriminate colors based on the difference in saturation and intensity because they are able to recognize only two hues. As a result, dichromats have extremely poor capability for recognizing information from colors of an image.

Figure 16:
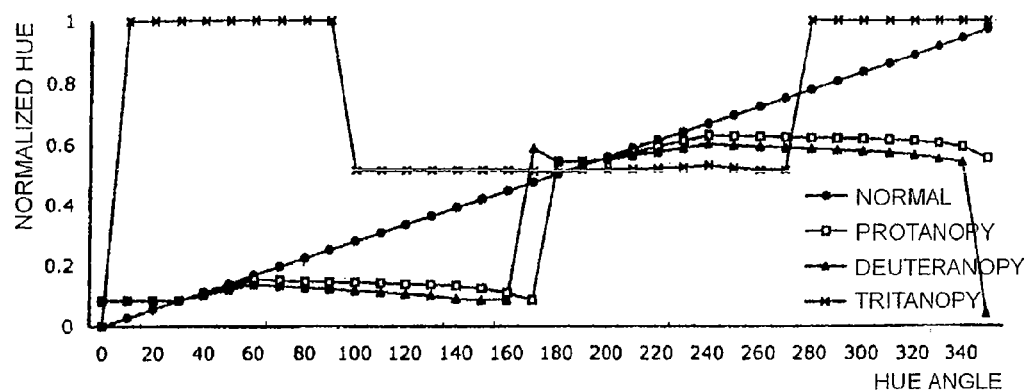
FIG. 16 is a view showing hues recognized by a normal human, a human with a deficiency of protanopy or deuteranopy, and a human with a deficiency of tritanopy for a hue angle in the range of 0° to 360°.

FIG. 16 shows a simulation of the hues recognized by protanopy, deuteranopy and tritanopy in comparison to the hues, from 0° to 360°, recognized by normal humans. In FIG. 16, the horizontal axis indicates the hue angles from 0° to 360° and the vertical axis indicates the hue values obtained by normalizing the hues from 0° to 360° to have values in the range of 0.0 to 1.0. As shown in FIG. 16, the hues recognized by protanopy, deuteranopy and tritanopy are divided into two types of hues.

Figure 17:
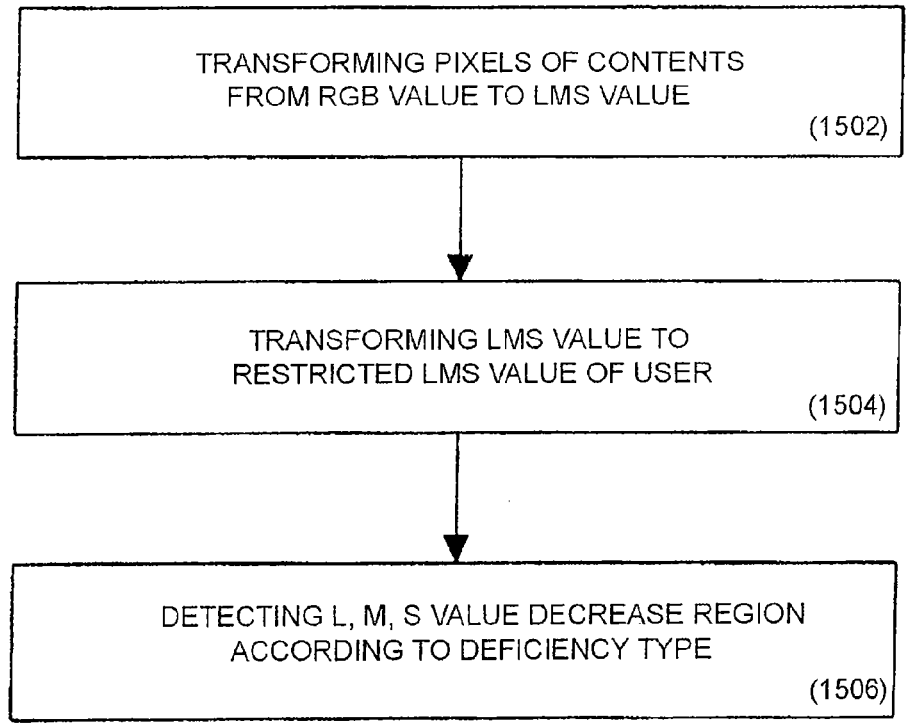
FIG. 17 is a detailed flowchart of another example of the process for discriminating the deficiency region in FIG. 12.

FIG. 17 is a detailed flowchart of another example for the method of discriminating a deficiency region in FIG. 12. As shown in FIG. 17, the pixels of the inputted visual contents are first transformed from the RGB color space to the LMS color space (step 1502). Next, the LMS values are transformed to the limited LMS space of a user with a deficiency of dichromacy (step 1504). Then, the L-value decrease region is detected in the case of protanopy, the M-value decrease region is detected in the case of deuteranopy, and the S-value decrease region is detected in the case of tritanopy (step 1506). It is also possible to detect a color deficiency region $R_{adaptation}$(x,y) by this method.

Figure 18:
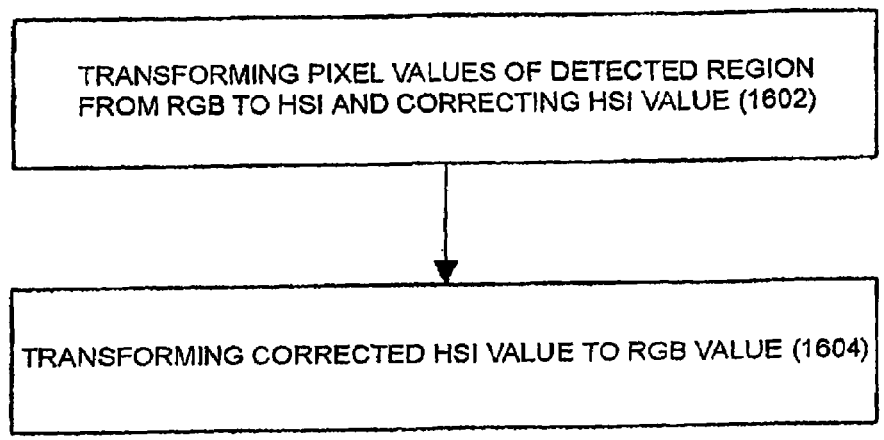
FIG. 18 is a detailed flowchart of an example of the HIS tuning method in FIG. 12.

After detecting the color deficiency region $R_{adaptation}$(x,y), the color correction is performed in the detected color deficiency region as follows. FIG. 18 is a detailed flowchart of an example of the HSI tuning method in FIG. 12. As shown in FIG. 18, the RGB values of the pixels corresponding to the detected deficiency region are first transformed into HSI values in Equation 23, and then the HSI values are corrected in Equation 24 (step 1602). Then, the corrected HSI values are transformed into RGB values again in Equation 25 (step 1604).

$$\begin{bmatrix} R(x, y) \\ G(x, y) \\ B(x, y) \end{bmatrix} \Rightarrow \begin{bmatrix} H(x, y) \\ S(x, y) \\ I(x, y) \end{bmatrix}, \quad \text{Equation 23}$$

Here, H, S, I values are normalized values in the range of 0.0 to 1.0.

$$\begin{bmatrix} H'(x, y) \\ S'(x, y) \\ I'(x, y) \end{bmatrix} \Rightarrow \begin{bmatrix} H(x, y) \\ S(x, y) \\ I(x, y) \end{bmatrix} + R_{adaptation}(x, y) \times \begin{bmatrix} h \\ s \\ i \end{bmatrix}, \quad \text{Equation 24}$$

Here, h, s, i values are adaptively transformed values in the range of 0.0 to 1.0.

$$\begin{bmatrix} H'(x, y) \\ S'(x, y) \\ I'(x, y) \end{bmatrix} \Rightarrow \begin{bmatrix} R'(x, y) \\ G'(x, y) \\ B'(x, y) \end{bmatrix} \quad \text{Equation 25}$$

Another method for adaptively transforming colors in accordance with the present invention is to determine the deficiency region and deficiency degree at the same time by using proportions of cyan, magenta, and yellow instead of detecting the deficiency region in Equation 21 and Equation 22. Protanopy or deuteranopy is expressed in Equation 26 and tritanopy is expressed in Equation 27. In this case, $R_{adaptation}$(x, y) is always 1 and the deficiency region and deficiency degree are determined with (h, s, i) at the same time.

(1) hue adaptive transformation: $h =$ Equation 26

$$\begin{cases} 0, & H \in \text{blue region} \\ \theta_{max} \times M(x, y), & \text{otherwise} \end{cases}$$

(2) saturation adaptive transformation: $s =$ $$\alpha_1 \times M(x, y) + \alpha_2 \times C(x, y)$$

Here, M(x, y) indicates the magenta values distributed in the space and C(x, y) indicates the cyan values distributed in the space. In Equation 26, h is the amount of change in hue for protanopy or deuteranopy and s is the amount of change in saturation for protanopy or deuteranopy. In the hue adaptation, if the hues of the original pixels are included in the blue region, the hue adaptation is not performed. The blue region is excluded from the object for the hue adaptation because the region is normally recognizable by protanopy or deuteranopy. $\Theta_{max}$ is the maximum value of the amount of change in hue, which means the maximum angle that the hue angle can move. Here, $\alpha_1$ and $\alpha_2$ are the maximum amounts of change in saturation using the magenta ratio and the cyan ratio and have values in the range of 0.0 to 1.0.

In the hue and saturation adaptation for dichromats, the magenta ratio, the cyan ratio and the yellow ratio are used in Equation 26. The magenta, cyan and yellow ratios are values obtained by transforming RGB values of pixels into values in the CMYK color space and normalizing the transformed CMY values to have values in the range of 0.0 to 1.0; and the magenta, cyan and yellow ratios indicate the proportions of magenta, cyan and yellow components contained in corresponding pixels, respectively.

Figure 19:
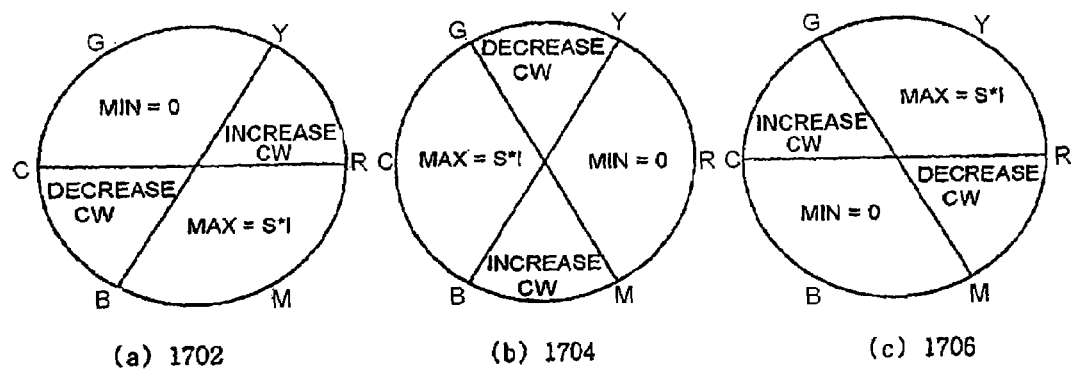
FIG. 19 is a view showing the distribution of magenta, cyan, and yellow components in the color distribution.

FIGS. 19a, 19b and 19c indicate a magenta ratio 1702, a cyan ratio 1704 and a yellow ratio 1706 in color distribution, respectively. First, the magenta ratio 1702 has the maximum value for the product in saturation with intensity for a hue angle in the range of 240° to 360°. For example, if both saturation and intensity have the maximum values, that is, if both the hue value and intensity value are 1.0, the magenta ratio is 1.0, that is, the product of the saturation value 1.0 multiplied by the intensity value 1.0. In another example, if the saturation value is 0.5 and the intensity value is 0.5, the magenta ratio is 0.25, that is, the product of the saturation value 0.5 multiplied by the intensity value 0.5. Furthermore, the magenta ratio is always 0 for a hue angle in the range of 60° to 180°. For a hue angle in the range of 0° to 60°, the magenta ratio linearly decreases from the maximum magenta ratio with a hue angle of 0° to the minimum magenta ratio with a hue angle of 60°. For a hue angle in the range of 180° to 240°, the magenta ratio linearly increases form the minimum ii magenta ratio with a hue angle of 180° to the maximum magenta ratio with an angle of 240°.

The cyan ratio 1704 has the maximum value of the product of saturation multiplied by intensity for a hue angle in the range of 120° to 240°. In addition, the cyan ratio is always 0 for a hue angle in the range of 0° to 60° and for a hue angle in the range of 300° to 360°. For a hue angle in the range of 60° to 120°, the cyan ratio linearly increases from the minimum cyan ratio with a hue angle of 60° to the maximum cyan ratio with a hue angle of 120°. For a hue angle in the range of 240° to 300°, the cyan ratio linearly decreases from the maximum cyan ratio with a hue angle of 240° to the minimum cyan ratio with a hue angle of 300°.

The yellow ratio 1706 has the maximum ratio of the product of saturation multiplied by intensity for a hue angle in the range of 0° to 120°. In addition, the yellow ratio is always 0 for a hue angle in the range of 180° to 300°. For a hue angle in the range of 120° to 180°, the yellow ratio linearly decreases from the maximum yellow ratio with a hue angle of 120° to the minimum yellow ratio with a hue angle of 180°. For a hue angle in the range of 300° to 360°, the cyan ratio linearly increases from the minimum yellow ratio with a hue angle of 300° to the maximum cyan ratio with a hue angle of 360°.

The magenta ratio is used in the process of hue adaptation for protanopy or deuteranopy due to the following reasons. The first reason is to exclude the yellow region normally distinguishable by protanopy or deuteranopy from the objects of hue adaptation. The second reason is to simultaneously adaptively transform not only the red region indistinguishable from green, but also the magenta region indistinguishable from blue. The third reason is to gradually change the hue because an abrupt transformation of the hue may deteriorate the quality of an image. The fourth reason to use the magenta ratio in the process of saturation adaptation for protanopy or deuteranopy is to provide a difference in saturation as a measure for differentiating the color changed to blue after the adaptation from the original blue. The fifth reason to use the cyan ratio is to provide a difference in saturation as a measure for differentiating the green region seen as yellow to protanopy or deuteranopy, from the original yellow region.

Unlike protanopy or deuteranopy, tritanopy has a principle problem in that a blue (adjacent to violet) is recognized as red and thus indistinguishable from the original red. Tritanopy normally recognizes blue green (cyan) and red only. Therefore, if hue angle of pixels of original image is included in the blue green region when using a method similar to that used for protanopy or deuteranopy, the hue adaptation is not performed. In general, the hue angle of 165° to 195° is used as the blue green angle.

(1) hue adaptive transformation: $h =$ Equation 27

$$\begin{cases} 0, & H \in \text{cyan region} \\ \theta_{max} \times Y'(x, y), & \text{otherwise} \end{cases}$$

(2) saturation adaptive transformation: $s =$ $$\beta_1 \times Y'(x, y) + \beta_2 \times M'(x, y)$$

Here, Y'(x, y) indicates the yellow component in the color changed by H', that is, the H value of the original color plus 0.5, and M'(x, y) indicates the magenta value in the color changed to the HSI value. In the Equation 27, h and s are the amount of change in hue and the amount of saturation for tritanopy, respectively. $\Theta_{max}$ is the maximum value of the amount of change in hue, which means the maximum angle that the hue angle can move. In the process of adaptation for tritanopy, the blue ratio and the green ratio are used; and in order to use these ratios, the yellow ratio that is the complementary color ratio of the blue ratio, and the magenta ratio that is the complementary ratio of the green ratio, are used instead of the blue and green ratios. Here, $\beta_1$ and $\beta_2$ are the maximum amounts of change in saturation using the blue ratio and green ratio and have values in the range of 0.0 to 1.0. The blue ratio is used ill the process of hue adaptation for tritanopy in order to exclude the red region from the object to be adaptively transformed, and if possible, the yellow ratio complementary to blue is used in order to obtain the blue ratio.

In the process of hue adaptation for tritanopy, the green ratio is also used beyond the blue ratio. The yellow ratio, complementary to blue ratio, is used to obtain the blue ratio; and the magenta ratio, complementary to green ratio, is used to obtain the green ratio. The reason to use the blue ratio is to provide a difference in saturation between the colors changed to red after the adaptation and the original red, thereby differentiating these two colors. The reason to use the green ratio is to provide a difference in saturation in order to differentiate the green region, seen as blue green to tritanopy, from the original blue green region.

Table 3 below is a color table of adaptation for dichromats in accordance with the present embodiment.

TABLE 3

| Type of Dichromacy | Indistinguishable Color | Recognizable Color | Adaptively Transformed Color |
|---|---|---|---|
| Protanopy or Deuteranopy | Red and Green | Yellow | Red → Magenta |
| Tritanopy | Blue and Yellow | Red | Blue → Green |

The embodiments described above are not intended to limit the scope of the present invention, but merely provided for those who skilled in the art to readily understand and embody the present invention. Therefore, it should be appreciated that various modification and change can be made within the scope of the present invention. In principle, the scope of the present invention is determined by the accompanying claims.

INDUSTRIAL APPLICABILITY

In accordance with the present invention as described above, a user with a color vision deficiency is able to receive semantic information that is almost the same as that of a normal human from visual contents without a separate apparatus. As a result, the user with a color vision deficiency can freely and conveniently use multimedia contents. In addition, the present invention is applicable to the digital item adaptive parts of MPEG-7 and MPEG-21 that are international standards in media.

What is claimed is:

1. A processor having program instructions stored in a memory therein which cause the processor to operate as a specially programmed processor executing a method for adaptively transforming visual contents to be suitable for color vision characteristics of a user comprising:
   receiving information on color vision characteristics of the user in the processor; and
   transforming adaptively in the specially programmed processor the visual contents in accordance with the information on color vision characteristics,
   wherein the information on color vision characteristics includes descriptions as to color vision deficiency type and color vision deficiency degree of the user; and
   wherein the color vision deficiency degree is represented in a numerical or in a textual description.

2. The method according to claim 1, further comprising:
   receiving information on the user environment,
   wherein the adaptive transforming is executed in accordance with the information on color vision characteristics and the user environment.

3. The method according to claim 2, wherein the user environment is described with the illumination of the surrounding of the user.

4. The method according to claim 1, wherein the color vision deficiency degree is described numerically or textually, and the color vision deficiency degree is described with a normalized numerical value when numerically described.

5. The method according to claim 1, wherein the adaptive transforming is executed by distinguishing between a dichromat and an anomalous trichromat according to the color vision deficiency degree, and approaching the dichromat and the anomalous trichromat differently.

6. The method according to claim 5, wherein the adaptive transforming for a dichromat is executed by the steps of:
   differentiating a deficiency region which is difficult for the user to detect, from the visual contents according to the color vision deficiency type; and
   adjusting at least one of hue, saturation and intensity of pixels in the deficiency region.

7. The method according to claim 6, wherein the differentiating of the deficiency region is executed by transforming the visual contents from RGB color space to CMYK color space, and discriminating pixels in the deficiency region by using the values of cyan, magenta, and yellow in accordance with the color vision deficiency type.

8. The method according to claim 6, wherein the differentiating of the deficiency region is executed by transforming the visual contents from RGB color space to LMS color space, transforming the transformed visual contents with LMS response function of the user, which is determined with the color vision deficiency type and the color vision deficiency degree, and measuring the degree of decrease of the respective LMS values.

9. The method according to claim 6, wherein the adjusting is executed by changing the hue and the saturation of the pixels in the deficiency region.

10. The method according to claim 5, wherein the adaptive transforming for an anomalous trichromat is executed by the steps of:
    transforming the visual contents from RGB color space to LMS color space;
    transforming the visual contents in LMS color space with an LMS response function of the user, which is determined with the color vision deficiency type and the color vision deficiency degree; and
    transforming again the transformed visual contents from LMS color space to RGB color space.

11. A processor having program instructions stored in a memory therein which cause the processor to operate as a specially programmed processor executing a method for adaptively transforming visual contents to be suitable for the color vision characteristics of a user of an image display device, the method comprising the steps of:
    receiving information on the color vision characteristics of the user in the processor;
    receiving visual contents in the processor;
    transforming adaptively in the specially programmed processor the visual contents in accordance with the information on the color vision characteristics; and
    displaying the transformed visual contents through the image display device;
    wherein the information on the color vision characteristics contains descriptions as to the color vision deficiency type and the color vision deficiency degree of the user; and
    wherein the color vision deficiency degree is represented in a numerical or in a textual description.

12. The method according to claim 11, wherein the information on the color vision characteristics contains descriptions as to the color vision deficiency type and the color vision deficiency degree of the user.

13. The method according to claim 12, wherein the color vision deficiency degree is described numerically or textually, and the color vision deficiency degree is described by a normalized numerical value when numerically described.

14. The method according to claim 12, wherein the numerical description of the color vision deficiency degree is determined in accordance with the shift or the intensity decrease of a response function of the user's cone cells.

15. The method according to claim 12, wherein the numerical description of the color vision deficiency degree is determined by using the total error score obtained from the Farnsworth-Munsell hue test for the user.

16. The method according to claim 12, wherein the numerical description for the color vision deficiency degree is determined by using the area of the red/green ratio section in a mixture field that is recognized by the user as identical to a test field after anomaloscope testing for the user.

17. The method according to claim 11, wherein the numerical description for the color vision deficiency degree is determined by the following equation:

$$\left\{ w_Z \times \left( \frac{\alpha}{\alpha_{max}} \right) + w_I \times \left( \frac{\beta}{\beta_{max}} \right) \right\} / (w_Z^{max} + w_I^{max})$$

wherein $\alpha$ is the shift value of the user's cone cells, $\alpha_{max}$ is the maximum shift value of the user's cone cells, $\beta$ is the intensity decrease value of the user's cone cells, $\beta_{max}$ is the maximum intensity decrease value of the user's cone cells, $\omega_z$ is a weighting value for the shift value, $\omega_I$ is the weighting value for the intensity decrease value, $\omega_z^{max}$ is the maximum value of $\omega_z$, and $\omega_I^{max}$ is the maximum value of $\omega_I$.

18. The method according to claim 11, wherein the numerical description of the color vision deficiency degree is determined by the following equation:

$$\begin{cases} \left\lfloor \frac{E - E_{min}}{E_{max} - E_{min}} \right\rfloor, & E_{min} < E < E_{max} \\ 1.0, & E \geq th_{max} \end{cases}$$

wherein E is the total error score of the user, $E_{min}$ is the minimum threshold value where the user is determined as an anomalous trichromat, and $E_{max}$ is the maximum threshold value where the user is determined as an anomalous trichromat.

19. The method according to claim 11, wherein the numerical description for the color vision deficiency degree is determined by the following equation:

$$\begin{cases} \left\lfloor \frac{R_d}{R_{th}} \right\rfloor, & R_d \leq R_{th} \\ 1.0, & R_d > R_{th}, \end{cases}$$

Here, $R_d = R_{max} - R_{min}$, $R_{th} = \begin{cases} R_{min}^{normal}, & \text{green color vision deficiency} \\ 73 - R_{max}^{normal}, & \text{red color vision deficiency} \end{cases}$ wherein $R_d$ is the range of a red/green ratio section in a mixture field that is recognized by the user as identical to the test field, $R^{normal}_{min}$ and $R^{normal}_{max}$ are the minimum and maximum values of the range of the red/green ratio section of a normal human, and $R_{th}$ is the minimum threshold value of $R_d$ where the user is determined as an anomalous trichromat.

20. The method according to claim 11, wherein the information on the color vision characteristics further comprises identification information on the user.

21. The method according to claim 11, further comprising the step of receiving information on the user's environment, wherein the visual contents are transformed in accordance with the information on the color vision characteristics and the user's environment.

22. The method according to claim 21, wherein the information on the user's environment comprises description as to the illumination of the user's surroundings.

23. A system for adaptively transforming visual contents to be suitable for the color vision characteristics of a user of an image display device, the system comprising:
   means for receiving information on the color vision characteristics of the user;
   means for receiving visual contents; and
   a processing section for adaptively transforming the received visual contents in accordance with the information on the color vision characteristics of the user;
   wherein the information on the color vision characteristics contains descriptions as to the color vision deficiency type and the color vision deficiency degree of the user, and the color vision deficiency degree is represented in a numerical or a textual description.

24. The system according to claim 23, further comprising:
   means for storing the information on the color vision characteristics and supplying the information on the color vision characteristics to the processing section in a standardized XML specification.

25. The system according to claim 23, wherein the information on the color vision characteristics contains descriptions as to the color vision deficiency type and the color vision deficiency degree of the user, and the color vision deficiency degree is described numerically or textually, and the color vision deficiency degree is described with a normalized numerical value when numerically described.

26. The system according to claim 23, wherein the numerical description for the color vision deficiency degree is determined by the following equation:

$$\left\{ w_Z \times \left( \frac{\alpha}{\alpha_{max}} \right) + w_I \times \left( \frac{\beta}{\beta_{max}} \right) \right\} / (w_Z^{max} + w_I^{max})$$

wherein $\alpha$ is the shift value of the user's cone cells, $\alpha_{max}$ is the maximum shift value of the user's cone cells, $\beta$ is the intensity decrease value of the user's cone cells, $\beta_{max}$ is the maximum intensity decrease value of the user's cone cells, $\omega_z$ is a weighting value for the shift value, $\omega_I$ is the weighting value for the intensity decrease value, $\omega_z^{max}$ is the maximum value of $\omega_z$, and $\omega_I^{max}$ is the maximum value of $\omega_I$.

27. The system according to claim 23, wherein the numerical description of the color vision deficiency degree is determined by the following equation:

$$\begin{cases} \left\lfloor \dfrac{E - E_{min}}{E_{max} - E_{min}} \right\rfloor, & E_{min} < E < E_{max} \\ 1.0, & E \geq th_{max} \end{cases}$$

wherein E is the total error score of the user, $E_{min}$ is the minimum threshold value where the user is determined as an anomalous trichromat, and $E_{max}$ is the maximum threshold value where the user is determined as an anomalous trichromat.

28. The system according to claim 23, wherein the numerical description for the color vision deficiency degree is determined by the following equation:

$$\begin{cases} \left\lfloor \dfrac{R_d}{R_{th}} \right\rfloor, & R_d \leq R_{th} \\ 1.0, & R_d > R_{th}, \end{cases}$$

Here, $R_d = R_{max} - R_{min}$, $R_{th} = \begin{cases} R_{min}^{normal}, & \text{green color vision deficiency} \\ 73 - R_{max}^{normal}, & \text{red color vision deficiency} \end{cases}$ wherein $R_d$ is the range of a red/green ratio section in a mixture field that is recognized by the user as identical to the test field, $R^{normal}_{min}$ and $R^{normal}_{max}$ are the minimum and maximum values of the range of the red/green ratio section of a normal human, and $R_{th}$ is the minimum threshold value of $R_d$ where the user is determined as an anomalous trichromat.

29. The system according to claim 23, wherein the processing section executes adaptive transforming for dichromat on the received visual contents in accordance with the color vision deficiency type if the user is determined to be a dichromat from the information on the color vision deficiency degree, and executes adaptation for anomalous trichromat on the received visual contents in accordance with the color vision deficiency type if the user is determined to be an anomalous trichromat from the information on the color vision deficiency degree.

30. A system according to claim 29, wherein the adaptive transforming for dichromat is executed by differentiating a deficiency region, which is difficult for the user to detect, from the visual contents in accordance with the color vision deficiency type; and transforming at least one of hue, saturation and intensity of pixels in the deficiency region.

31. A system according to claim 30, wherein the differentiating of the deficiency region is executed by transforming the visual contents from RCB color space to CMYK color space, and discriminating pixels corresponding to a predetermined region in the CYMK color space in accordance with the color vision deficiency type.

32. A system according to claim 30, wherein the differentiating of the deficiency region is executed by transforming the visual contents from RCB color space to CMYK color space, and measuring the degree of decrease of the respective LMS values during the process of transforming the transformed visual contents with a LMS response function of the user, in which the response function is determined in accordance with the color vision deficiency type and the color vision deficiency degree.

33. A system according to claim 29, wherein the adaptive transforming for dichromat is executed by determining the color vision deficiency region and the color vision deficiency degree of the user at the same time by using a CMY ration of the visual contents.

34. A system according to claim 23, wherein the adaptive transforming for anomalous trichromat is executed by transforming the visual contents from RGB color space to LMS color space, transforming the visual contents in LMS color space by using the inverse function of an LMS response function of the user, in which the LMS response function is determined in accordance with the color vision deficiency type and the color vision deficiency degree, and transforming again the transformed visual contents from LMS color space to RGB color space.

* * * * *